(12) United States Patent
Hwang et al.

(10) Patent No.: US 10,389,496 B2
(45) Date of Patent: Aug. 20, 2019

(54) APPARATUS AND METHOD FOR DETERMINING A TIME RESOURCE UNIT

(71) Applicant: LG ELECTRONICS INC., Seoul (KR)

(72) Inventors: Daesung Hwang, Seoul (KR); Yunjung Yi, Seoul (KR); Bonghoe Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/579,421

(22) PCT Filed: Jun. 13, 2016

(86) PCT No.: PCT/KR2016/006233
§ 371 (c)(1),
(2) Date: Dec. 4, 2017

(87) PCT Pub. No.: WO2016/208897
PCT Pub. Date: Dec. 29, 2016

(65) Prior Publication Data
US 2018/0145802 A1 May 24, 2018

Related U.S. Application Data

(60) Provisional application No. 62/278,975, filed on Jan. 14, 2016, provisional application No. 62/217,014, (Continued)

(51) Int. Cl.
H04L 5/00 (2006.01)
H04W 72/04 (2009.01)
H04W 28/26 (2009.01)

(52) U.S. Cl.
CPC .......... H04L 5/0005 (2013.01); H04L 5/0048 (2013.01); H04W 28/26 (2013.01);
(Continued)

(58) Field of Classification Search
CPC ............... H04L 5/0005; H04L 5/0048; H04W 72/0453; H04W 72/0446; H04W 28/26; H04W 72/04; H04W 72/0406
See application file for complete search history.

(56) References Cited

U.S. PATENT DOCUMENTS

2013/0077582 A1 3/2013 Kim et al.
2013/0195002 A1 8/2013 Walker et al.
(Continued)

FOREIGN PATENT DOCUMENTS

WO WO 2009/052420 A2 4/2009

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211, V10.4.0, Dec. 2011, 101 pages.
(Continued)

Primary Examiner — Omar J Ghowrwal
(74) Attorney, Agent, or Firm — Birch, Stewart, Kolasch & Birch, LLP

(57) ABSTRACT

The disclosure of the present specification provides a method in which a narrowband-Internet of things (NB-IoT) device transmits an uplink channel. The method comprises: determining an uplink subcarrier spacing for transmitting an uplink channel; determining the length of a subframe on the basis of the subcarrier spacing; and transmitting the uplink channel in a subframe having the determined length. The last part of the subframe may be excluded from the transmission of the uplink channel.

10 Claims, 19 Drawing Sheets

Related U.S. Application Data filed on Sep. 10, 2015, provisional application No. 62/184,229, filed on Jun. 24, 2015, provisional application No. 62/182,646, filed on Jun. 22, 2015.

(52) U.S. Cl.
CPC ....... *H04W 72/04* (2013.01); *H04W 72/0446* (2013.01); *H04W 72/0453* (2013.01); *H04W 72/0406* (2013.01)

(56) References Cited

U.S. PATENT DOCUMENTS

| | | |
|---|---|---|
| 2013/0322363 A1 | 12/2013 | Chen et al. |
| 2014/0286255 A1* | 9/2014 | Nam ............... H04L 1/1861 370/329 |
| 2018/0213468 A1* | 7/2018 | Chatterjee ............ H04L 5/0053 |

OTHER PUBLICATIONS

LG Electronics et al., "WF on Handling Legacy SRS", R1-153650, 3GPP TSG RAN WG1 #81, Fukuoka, Japan, May 25-29, 2015, 2 pages.
Samsung, "Considerations of legacy SRS impact on uplink transmission from low-cost UE", R1-152845, 3GPP TSG RAN WG1 Meeting #81, Fukuoka, Japan, May 25-29, 2015, 2 pages.
Ericsson, "Numerology for NR," 3GPP TSG RAN WG1 Meeting #84bis, R1-163227, Busan, Apr. 11-15, 2016, 16 pages.
Supplementary European Search Report for EP 16 81 4610 dated Jan. 28, 2019.

\* cited by examiner

APPARATUS AND METHOD FOR DETERMINING A TIME RESOURCE UNIT

CROSS REFERENCE TO RELATED APPLICATIONS

This application is the National Phase of PCT International Application No. PCT/KR2016/006233, filed on Jun. 13, 2016, which claims priority under 35 U.S.C. 119(e) to U.S. Provisional Application No. 62/182,646, filed on Jun. 22, 2015, No. 62/184,229, filed on Jun. 24, 2015, No. 62/217,014, filed on Sep. 10, 2015, and No. 62/278,975, filed on Jan. 14, 2016, all of which are hereby expressly incorporated by reference into the present application.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Recently, IoT (Internet of Things) communication has attracted attention. The IoT refers to communications that do not involve human interaction. There is a dissection about trying to accommodate such IoT communications in a cellular-based LTE system.

However, since the legacy LTE system has been designed for the purpose of supporting high-speed data communication, such an LTE system has been regarded as an expensive communication system.

However, the IoT communication is required to be implemented at a low price because of its characteristics, so that it may be widely used.

Therefore, there have been discussions to reduce the bandwidth of the IoT communication for the sake of cost reduction. However, in order to reduce the bandwidth, the structure of the frame in the time domain must be newly designed. However, there has been no discussion about this yet. In addition, when the structure of the frame is newly designed, it is necessary to newly consider the interference problem with neighboring legacy LTE terminals.

SUMMARY OF THE INVENTION

Accordingly, a disclosure of the present specification has been made in an effort to solve the aforementioned problem.

To achieve the foregoing purposes, the disclosure of the present invention proposes a method for transmitting an uplink channel. The method may be performed by a narrowband-internet of things (NB-IoT) device and comprise: determining an uplink subcarrier spacing for transmitting the uplink channel; determining a subframe length based on the uplink subcarrier spacing; transmitting the uplink channel on a subframe having the determined length. A last portion of the subframe may be excepted for transmitting the uplink channel.

In one embodiment, the subcarrier spacing is determined to be 3.75 kHz or 15 kHz.

In one embodiment, when the subcarrier spacing is 3.75 kHz, the subframe length is determined to be 2 ms; or when the subcarrier spacing is 15 kHz, the subframe length is determined to be 1 ms.

In one embodiment, the last portion is excluded for transmission of the uplink channel only when the last portion is overlapped with a temporal resource used for transmission of a sounding reference signal (SRS) by a LTE-based UE adjacent to the NB IoT device.

In one embodiment, the last portion is excluded for transmission of the uplink channel to secure the SRS transmission by the LTE-based UE.

In one embodiment, the method further comprises receiving information on the SRS from a cell to which the LTE-based UE belongs.

In another aspect for achieving the purposes, there is provided a narrowband-internet of things (NB-IoT) device configured for transmitting an uplink channel, the device comprising: a transmission and reception unit configured to transmit and receive a radio signal; and a processor connected to the unit, wherein the processor is configured for: determining a spacing between uplink subcarriers used for transmitting the uplink channel; determining a subframe length based on the uplink subcarrier spacing; controlling the transmission and reception unit to transmit the uplink channel on a subframe having the determined length, wherein a last portion of the subframe is excepted for transmitting the uplink channel.

According to the disclosure of the present specification, the problems of the above-described prior art are solved.

DESCRIPTION OF EXEMPLARY EMBODIMENTS

Figure 1:
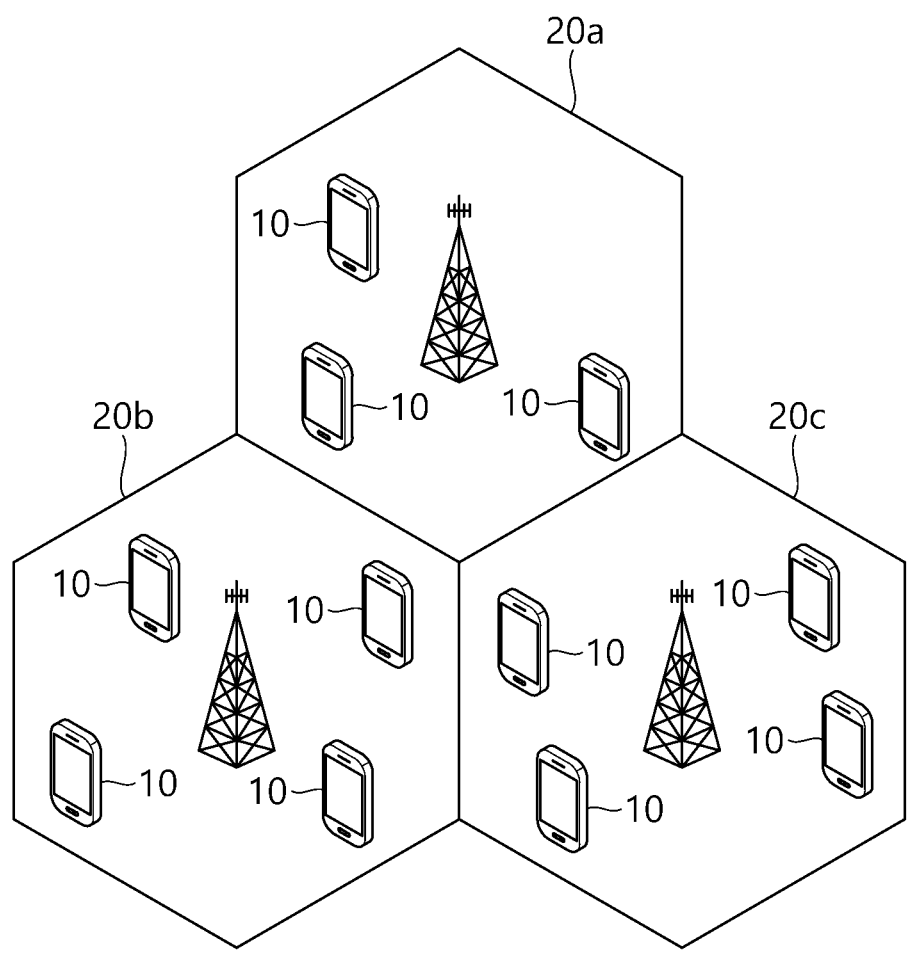
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LIE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
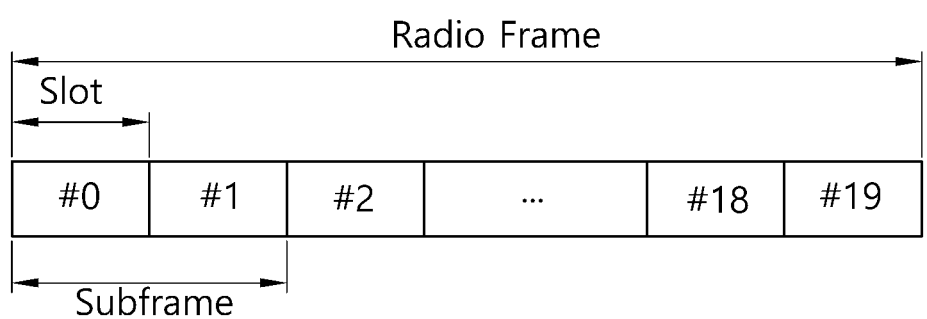
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly,

TABLE 1

| UL-DL config-uration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame

TABLE 2

| | Normal CP in downlink | | | Extended CP in downlink | | |
|---|---|---|---|---|---|---|
| | | UpPTS | | | UpPTS | |
| Special subframe configuration | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | | the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
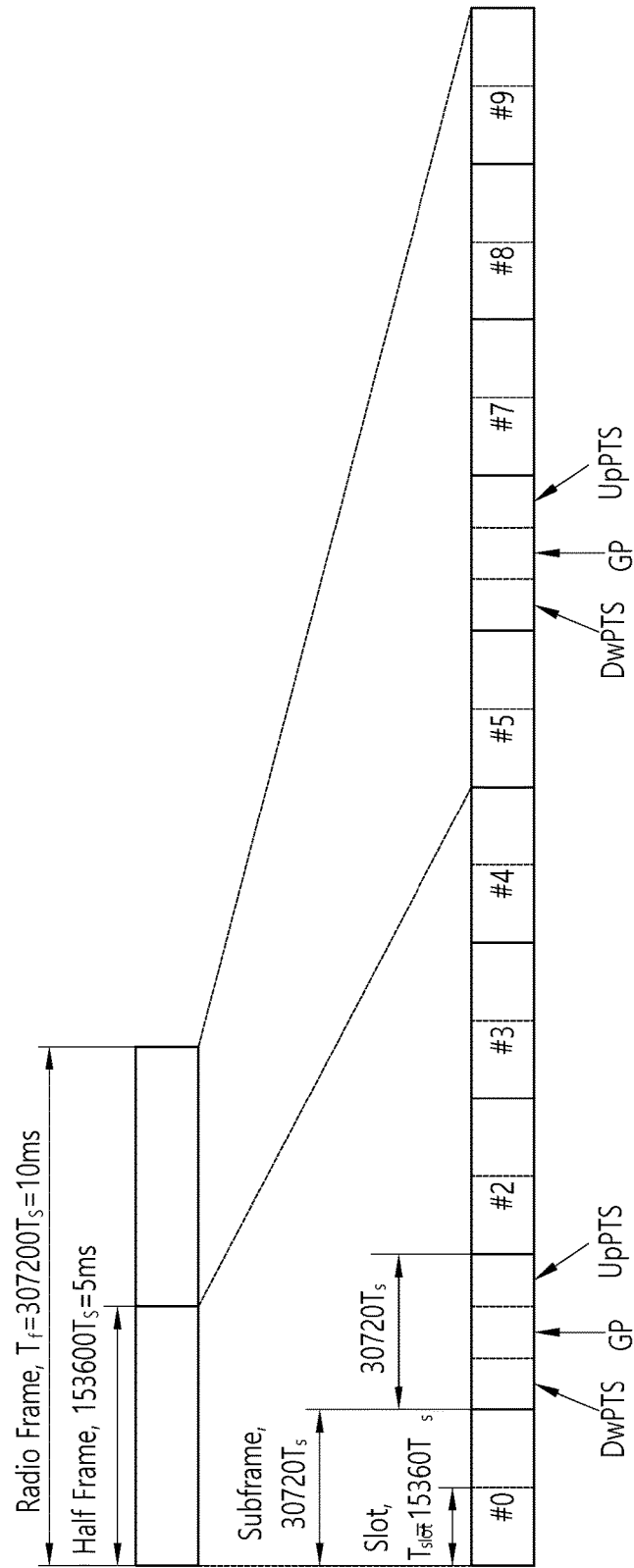
FIG. 3 illustrates a structure of a downlink radio frame according to TDD in the 3GPP LTE.

FIG. 3 illustrates the architecture of a downlink radio frame according to IDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP(Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

Figure 4:
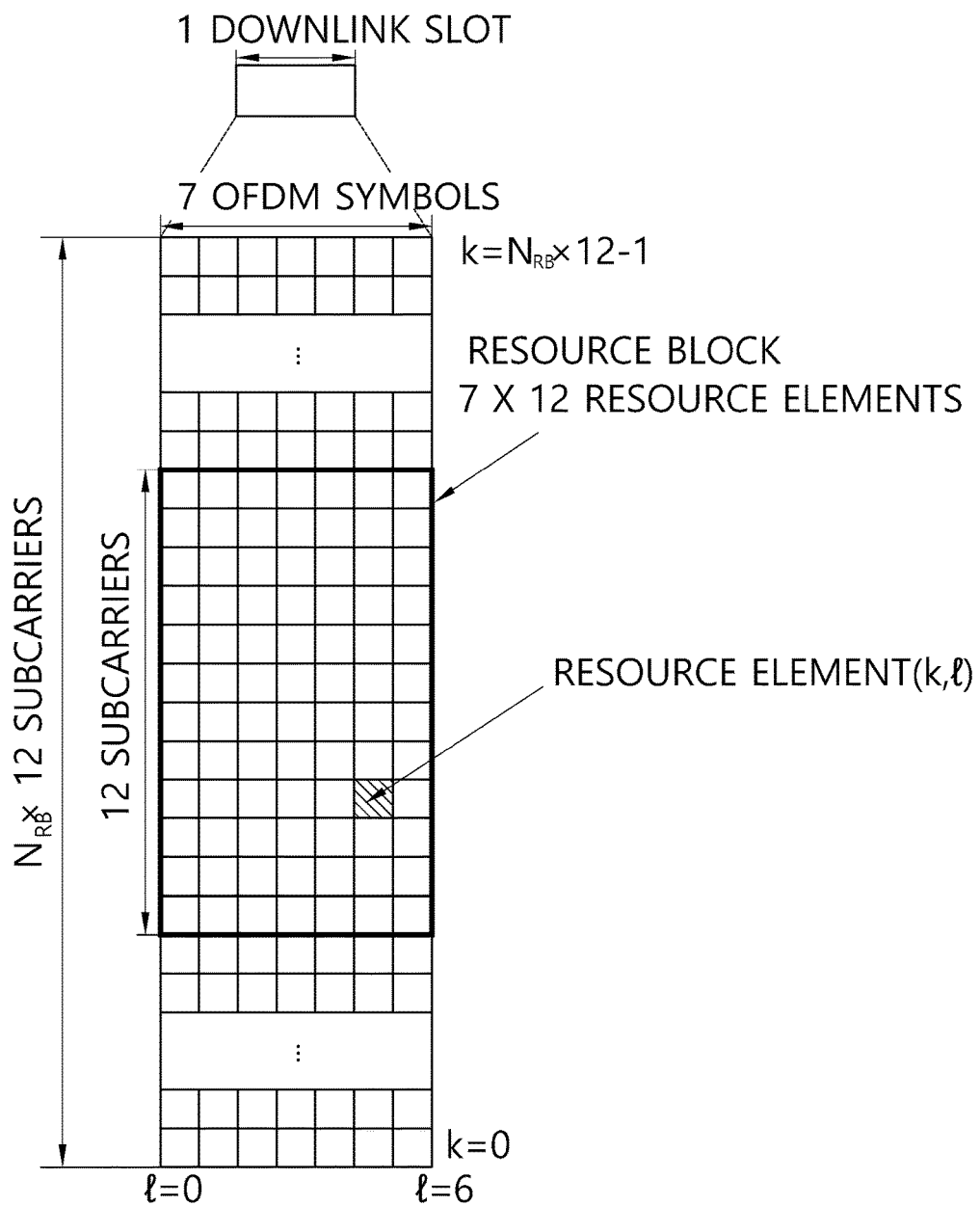
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 5:
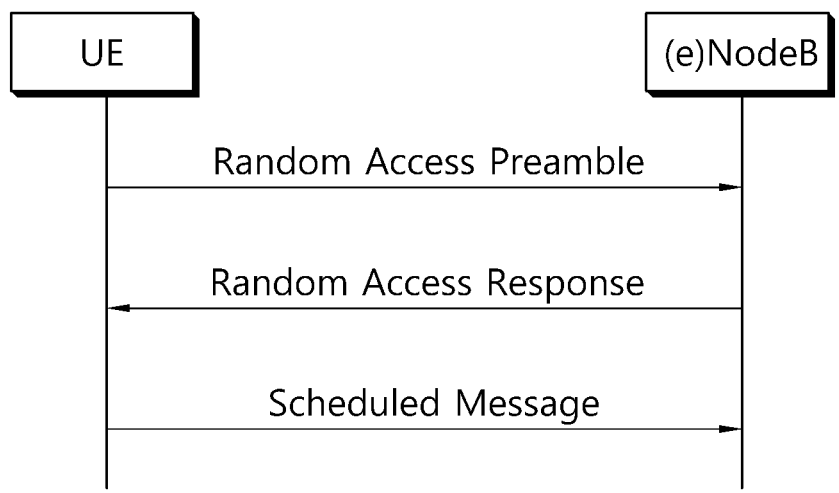
FIG. 5 is a flowchart illustrating a random access procedure in 3GPP LTE.

FIG. 5 is a flowchart illustrating a random access procedure in 3GPP LTE.

The random access procedure is used for the UE 10 to achieve UL synchronization with the base station, that is, eNodeB 20, or for UE to receive UL radio resource assignment from the base station.

The UE 10 receives a root index and a physical random access channel (PRACH) configuration index from the eNodeB 20. Each cell has 64 candidate random access preambles defined by a ZC (Zadoff-Chu) sequence. The root index refers to a logical index used for the UE to generate the 64 candidate random access preambles.

The transmission of random access preambles is limited to specific time and frequency resources for each cell. The PRACH configuration index indicates a specific subframe available for transmission of the random access preamble and a preamble format.

The UE 10 transmits an arbitrarily selected random access preamble to the eNodeB 20. In this connection, the UE 10 selects one of the 64 candidate random access preambles. Further, the UE 10 selects a subframe corresponding to the PRACH configuration index. The UE 10 transmits the selected random access preamble on the selected subframe.

Upon receiving the random access preamble, the eNodeB 20 sends a random access response (RAR) to the UE 10. The random access response is detected using two steps as follows. First, the UE 10 detects a PDCCH masked using a random access-RNTI (R-RNTI). Then, the UE 10 receives the random access response in a MAC (Medium Access Control) PDU (Protocol Data Unit) on a PDSCH indicated by the detected PDCCH.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<IoT (Internet of Things) Communication>

Hereinafter, the IoT communication will be described.

Figure 6A:
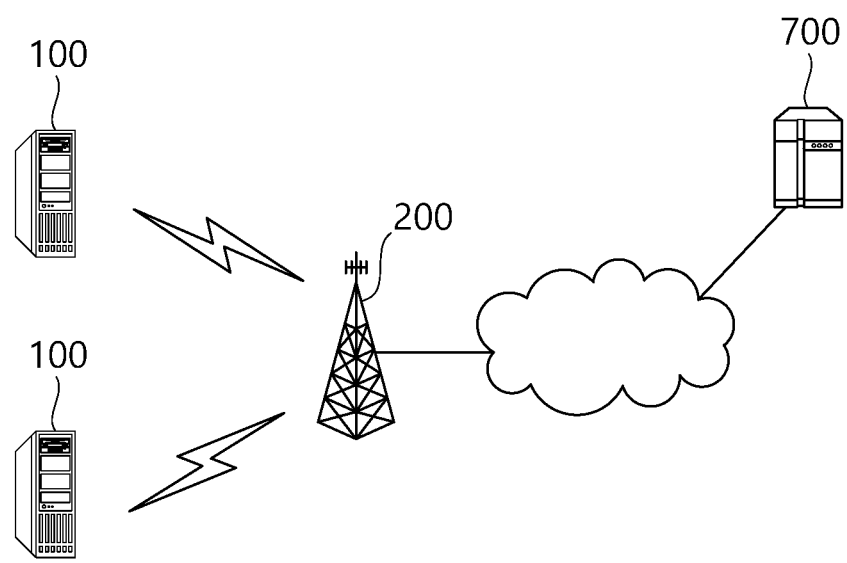
FIG. 6A shows an example of IoT (Internet of Things) communication.

FIG. 6A shows an example of IoT (Internet of Things) communication.

The IoT communication refers to the exchange of information between the IoT devices 100 without human interaction through the base station 200 or between the IoT device 100 and the server 700 through the base station 200.

In this way, the IoT communication is also referred to as CIoT (Cellular Internet of Things) in that the IoT communication is performed through the cellular base station.

This IoT communication may refer to a kind of machine type communication (MTC). Therefore, the IoT device may be referred to as an MTC device.

The IoT service is differentiated from the conventional communication service in which a person is involved. The IoT service may include various categories of services, including tracking, metering, payment, medical services, and remote controls. For example, the IoT services may include meter reading, water level measurement, surveillance camera utilization, vending machine related inventory reporting, and so on.

The IoT communication has a small amount of transmitted data. Further, uplink or downlink data transmission/reception rarely occurs. Accordingly, it is desirable to lower a price of the IoT device 100 and reduce battery consumption in accordance with the low data rate. In addition, since the IoT device 100 has low mobility, the IoT device 100 has substantially the unchanged channel environment.

Figure 6B:
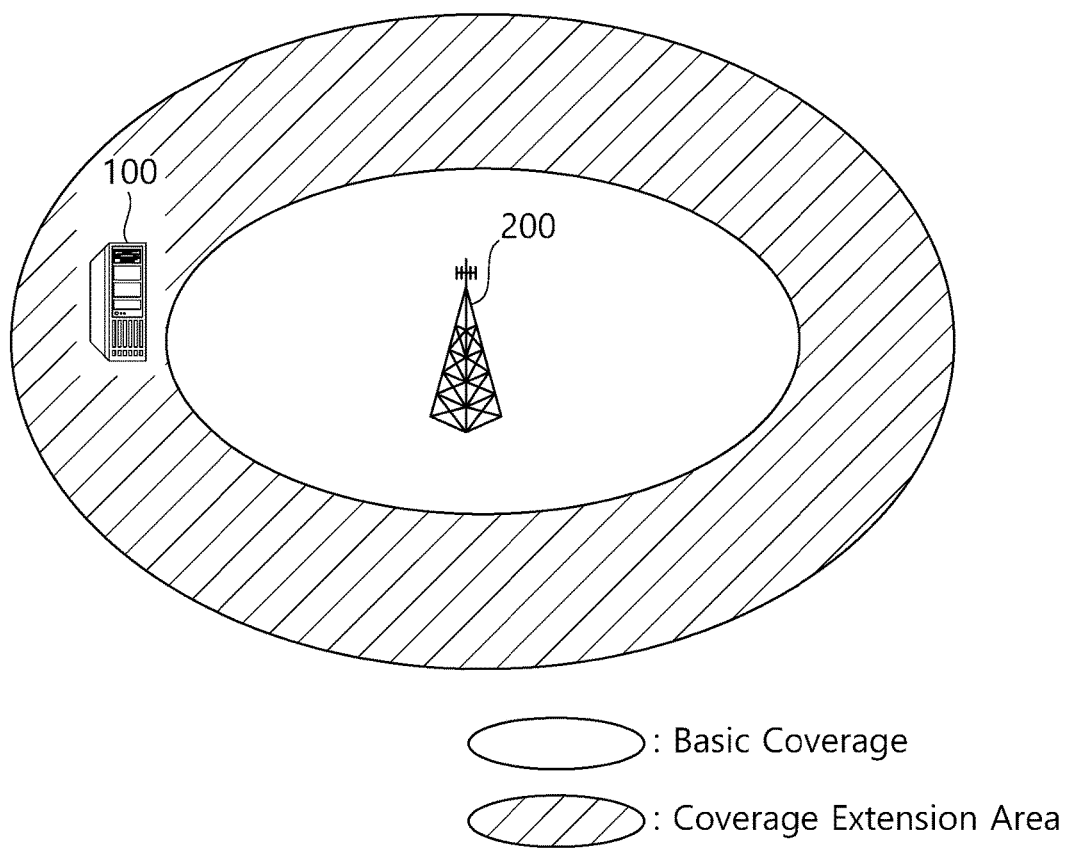
FIG. 6B is an example of a cell coverage extension or enhancement for an IoT device.

FIG. 6B is an example of a cell coverage extension or enhancement for the IoT device.

Recently, it is considered to extend or enhance the cell coverage of the base station for the IoT device 100. To this end, various techniques for cell coverage extension or enhancement are discussed.

However, if the coverage of the cell is extended or enhanced, and when the base station transmits the downlink channel to the IoT device located in the coverage extension (CE) or coverage enhancement (CE) region, the IoT device has difficulty in receiving the downlink channel. Similarly, when the IoT device located in the CE region transmits the uplink channel to the base station as the channel is, the base station has difficulty in receiving the uplink channel.

In order to solve this problem, the downlink channel or uplink channel may be repeatedly transmitted on a plurality of subframes. The transmission of uplink/downlink channels repeatedly on the plurality of subframes is referred to as bundle transmission.

Thus, the IoT device or base station may receive the bundle of downlink/uplink channels on the plurality of subframes, and may decode a part or all of the bundle. As a result, the decoding success rate can be increased.

Figure 7A:
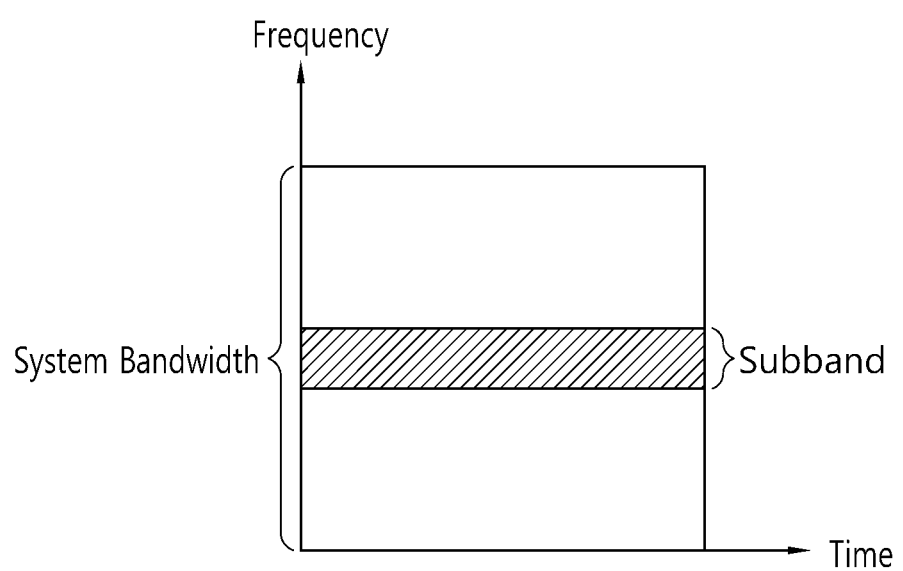
FIGS. 7A and 7B are views illustrating examples of a sub-band in which an IoT device operates.
Figure 7B:
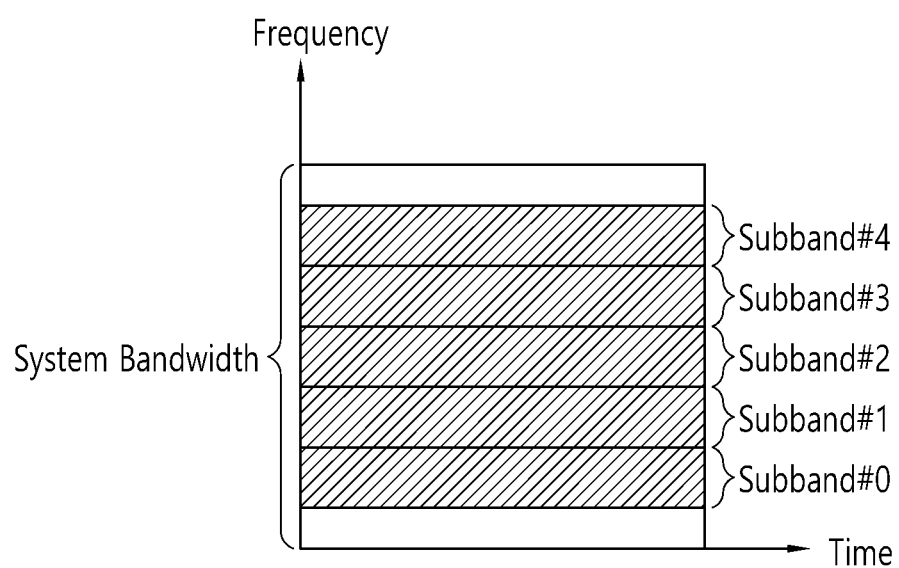

FIG. 7A and FIG. 7B are views illustrating examples of a sub-band in which the IoT device operates.

In one approach to a low cost of the IoT device, as shown in FIG. 7A, the IoT device may use, for example, a sub-band of approximately 1.4 MHz regardless of a system bandwidth of the cell.

In this connection, the region of the sub-band in which the IoT device operates may be located in a central region (for example, six middle PRBs) of the system bandwidth of the cell, as shown in FIG. 7A.

Alternatively, as shown in FIG. 7B, in order to multiplex the IoT devices in one subframe, a plurality of sub-bands for the IoT devices are allocated in one subframe, so that different sub-bands may be used by different IoT devices. In this connection, most of the IoT devices may use sub-bands other than the sub-bands in the central region (e.g., the middle six PRBs) of the system band of the cell.

The IoT communication operating on such a reduced bandwidth may be called NB (Narrow Band) IoT communication or NB CIoT communication.

Figure 8:
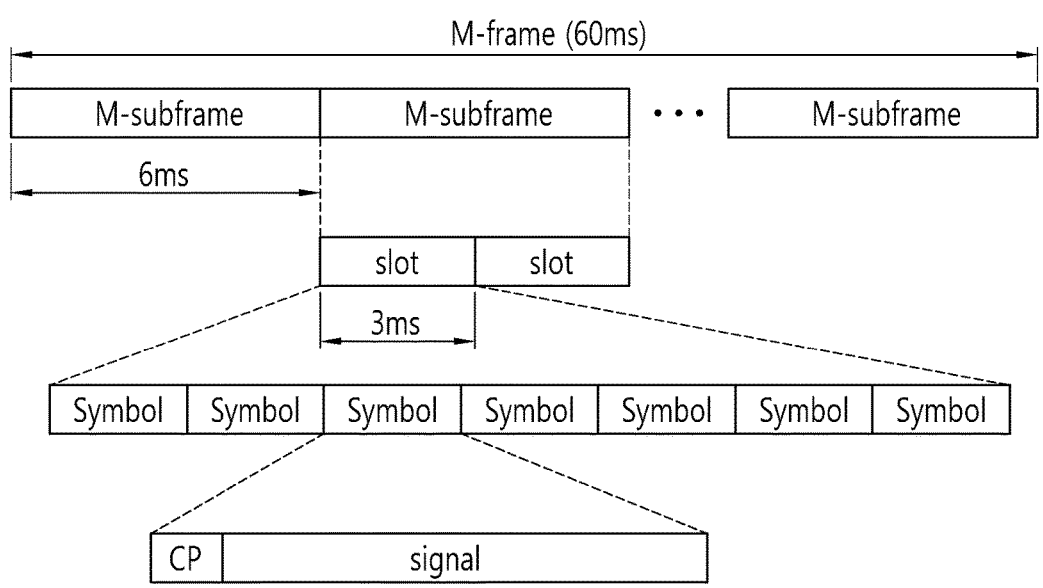
FIG. 8 shows an example of a time resource used for NB-IoT on M-frames basis.

FIG. 8 shows an example of a time resource used for the NB-IoT communication on M-frames basis.

Referring to FIG. 8, a frame that may be used for NB-IoT communication may be referred to as an M-frame, and the length of the M-frame may be illustratively 60 ms. Further, a subframe that may be used for the NB IoT communication may be referred to as an M-subframe, and its length may be exemplarily 6 ms. Thus, the M-frame may include ten M-subframes.

Each M-subframe may include two slots, and each slot may be illustratively 3 ms in length.

However, unlike what is shown in FIG. 8, a slot that may be used for the NB IoT communication may have a length of 2 ms. In this case, the subframe may have a length of 4 ms and the frame may have a length of 40 ms. Such a case will be described in more detail with reference to FIG. 9.

Figure 9:
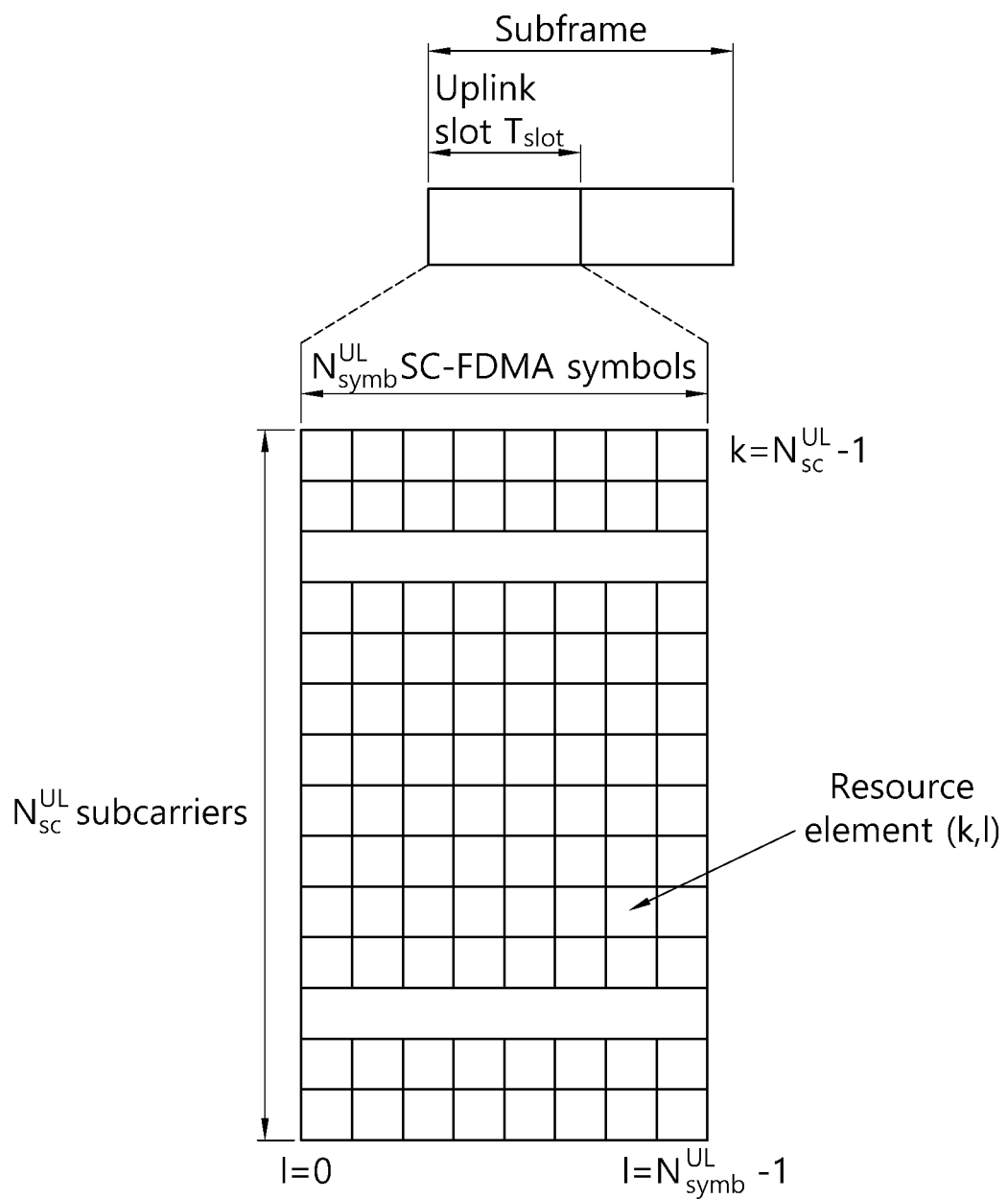
FIG. 9 shows another example of a time resource and a frequency resource that may be used for an NB IoT device.

FIG. 9 is another example of a time resource and a frequency resource that may be used for the NB IoT communication.

Referring FIG. 9, a physical channel or a physical signal transmitted on one slot in the uplink of the NB-IoT communication includes $N_{symb}^{UL}$ SC-FDMA symbols in the time domain, and $N_{sc}^{UL}$ subcarriers in the frequency domain. The uplink physical channel may be divided into an NPUSCH (Narrowband Physical Uplink Shared Channel) and an NPRACH (Narrowband Physical Random Access Channel). Further, in the NB-IoT communication, the physical signal may be NDMRS (Narrowband DeModulation Reference Signal).

In the NB-IoT communication, during the $T_{slot}$ slot, the uplink bandwidth of the $N_{sc}^{UL}$ subcarriers is as follows.

TABLE 3

| Subcarrier spacing | $N_{sc}^{UL}$ | $T_{slot}$ |
|---|---|---|
| Δf = 3.75 kHz | 48 | 61440 * $T_s$ |
| Δf = 15 kHz | 12 | 15360 * $T_s$ |

In the NB-IoT communication, each resource element (RE) of a resource grid nay be defined using an index pair (k, l) respectively indicating a time region and a frequency region in the corresponding slot. In this connection, k=0, ... $N_{sc}^{UL}$ –1, and l=0, ... $N_{symb}^{UL}$–1.

In the NB-IoT communication, a resource unit (RU) is used to map the NPUSCH to the resource element (RE). The resource units (RU) may be defined as successive subcarriers $N_{sc}^{RU}$, and successive SC-FDMA symbols $N_{symb}^{UL} N_{slots}^{UL}$.

In this connection, $N_{sc}^{RU}$, $N_{symb}^{UL}$ and $N_{slots}^{UL}$ may be as follows:

TABLE 4

| NPUSCH format | Δf | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

In the above table, NPUSCH format 1 is used to transmit the uplink data channel. Further, NPUSCH format 2 is used to transmit uplink control information.

Symbols of a symbol block z(0), ..., $z(M_{symb}^{ap}-1)$ are multiplied by a amplitude scaling factor based on a transmission power PNPUSCH. Then, the multiplied symbols z(0), ..., $z(M_{symb}^{app}-1)$ are mapped sequentially from z(0) to $z(M_{symb}^{ap}-1)$ to subcarriers allocated for transmission of the NPUSCH. The mapping for the resource element (k, l) starts at a first slot in an assigned resource unit (RU). Then, the resource element (k, l) is mapped in an increasing order from an index k to an index l. The NPUSCH may be mapped to one or more resource units (RUs).

<Embodiments of the Present Disclosure>

Hereinafter, as used herein, a device that operates on a reduced bandwidth in accordance with low-complexity/low-capability/low-specification/low-cost will be referred to as an LC device or a BL (bandwidth reduced) device or an NB-IoT device. In this connection, according to an embodiment of the present disclosure, coverage extension/enhancement (CE) may be divided into two modes. In a first mode (also referred to as CE mode A), repeated transmission is not performed, or a small number of repeated transmissions are performed. In a second mode (also referred to as CE mode B), a large number of repeated transmissions are allowed. Which of the above two modes to be activated may be signaled to the NB-IoT device (or LC device or BL device). In this connection, parameters assumed by the NB-IoT device for transmission and reception of the control channel/data channel may vary based on the CE mode. Further, the DCI format monitored by the NB-IOT device may vary based on the CE mode. However, some physical channels may be repeatedly transmitted the same number of times irrespective of whether the CE mode A or the CE mode B is activated.

As described above, when the system bandwidth is divided into several sub-bands, only one NB-IoT device (or LC device or BL device) may be supported in one sub-band at one time point.

However, if multiple NB-IoT devices (or LC devices or BL devices) access one sub-band, the base station needs to design an initial connection procedure for selecting or managing one NB-IoT device suitable for the corresponding sub-band, and a corresponding transmission channel. Basically, the base station should be able to detect and identify the NB-IoT device via the initial connection procedure by the NB-IoT device, that is, the random access channel (RACH) transmission procedure by the NB-IoT device. In addition, the corresponding NB-IoT device must be capable of uplink synchronization via an initial connection procedure, i.e., a RACH transmission procedure.

Hereinafter, according to the present disclosure, a RACH design method by the NB-IoT device and NB-IoT device selection method by base station are proposed based on a case where RACH transmissions are allowed to be multiplexed by a plurality of NB-IoT devices (or LC devices or BL devices) and a case where RACH transmissions are not allowed to be multiplexed by a plurality of NB-IoT devices (or LC devices or BL devices).

1. A Case where RACH Transmissions are Allowed to be Multiplexed by a Plurality of NB-IoT Devices The relative positions of multiple NB-IoT devices (or LC devices or BL devices) relative to the specific base station on the network may be different from each other. Therefore, the arrival times of the RACHs to be received by the base station may be different due to the propagation delay. In this situation, when each of a plurality of NB-IoT devices use the same sequence as a RACH, the base station has no way of knowing whether the RACHs are transmitted by a plurality of NB-IoT devices or one NB-IoT device transmits a RACH and the base station has received the RACH in a superimposed manner via multi-paths.

Therefore, when a plurality of NB-IoT devices (or LC devices or BL devices) transmit RACHs at similar time points (or in the case of transmitted RACHs being partially or wholly overlapped), the NB-IoT device transmitting the RACH arriving at the base station later in time may be difficult to be detected by the base station. Further, even when a specific NB-IoT device transmits a RACH ahead of other NB-IoT devices, the base station receives the RACH of the specific NB-IoT device and the RACHs of said other NB-IoT devices in an overlapped manner. Thus, reception performance of the RACHs deteriorates, and therefore, reception of the RACH at that point in time may be difficult. Basically, a RACH refers to a transmission channel that may be transmitted by an NB-IoT device at the time of initial connection, and thus it is general that RACH transmissions by a plurality of NB-IoT devices may collide with each other. Therefore, even when it is assumed that only one NB-IoT device is accessible on one sub-band, at least the RACHs used at the initial connection need to be designed to be multiplexed by the plurality of NB-IoT devices.

The following are more specific examples as for RACH designs. Basically; each NB-IoT device (or an LC device or a BL device) may transmit the RACH at the timing according to the downlink synchronization resulting from synchronizing the downlink.

As a first example, a base station allocates a plurality of RACH resources on a time-domain. For example, the base station may configure a plurality of RACH transmission start positions within a basic transmission unit (for example, sample, symbol, slot, subframe, frame, etc.). In further detail, information about the starting subframe and/or slot and/or frame used by the NB-IoT device to initiate the RACH transmission may be configured or predefined for each coverage class. In one example, if the length of time used for transmission for coverage class 1 is set to one subframe, a timing at which RACH transmission may be initiated may be configured or designated as an "N"*subframe unit. In this connection, the base station may only transmit "N" as the configuration value. On the other hand, on the basis of each RACH transmission length, RACH transmission start points of time may be different between the coverage classes. Alternatively, the base station may configure these Ns differently between coverage classes. In addition, this N may be a value that changes at each retransmission. In one example, when the timing at which the first RACH transmission may start is set to 10*subframe units, the first RACH retransmission may occur every 5*subframe units. Furthermore, the second RACH retransmission may occur every 2*subframe units which is shorter than the timing in the previous retransmission. This is to give more RACH transmission opportunities for each retransmission. This is also to prioritize the RACH retransmission over the initial transmission.

Alternatively, the RACH resources used for RACH initial transmission and retransmission may be configured differently.

The resource used for RACH initial transmission may be a subset of the resources that may be used for RACH retransmission. This may mean that more resources are available, as the number of retransmissions increases. Such a resource may refer to a time and/or frequency resource or a code/preamble resource. Alternatively, it may also be considered to increase the probability of RACH transmission success by increasing the power used for RACH retransmission. In general, if the RACH transmission fails despite the retransmission of the RACH, the RACH transmission may be resumed after a predetermined time corresponding to the backoff has elapsed. Thus, after the predetermined period of time in accordance with the backoff, the RACH transmission may be performed again using a first available starting subframe and/or slot and/or frame. In this connection, the predetermined time period according to the backoff may be configured as the smallest unit time. For example, one subframe may be used as the unit time of the backoff, or one slot may be used as the unit time of the backoff. When there occurs a slot or subframe that cannot be used to perform the RACH transmission after performing the backoff, the NB-IoT device may perform a backoff again or may perform a RACH transmission using the next available resource.

This will be described below with reference to FIG. 10.

Figure 10:
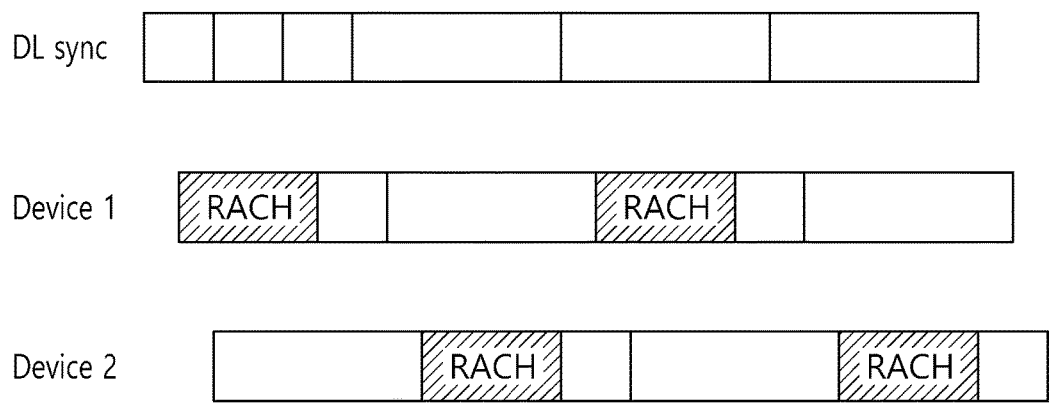
FIG. 10 shows a first example in which RACHs are multiplexed by a plurality of NB-IoT devices.

FIG. 10 shows a first example for multiplexing RACHs by a plurality of NB-IoT devices.

As shown in FIG. 10, a plurality of NB-IoT devices (or LC devices or BL devices) may select RACH resources so that the RACH resources do not overlap with each other on the time axis, and then transmit the selected RACH resources. This allows the base station to distinguish between different RACHs. Additionally, in order to prevent some overlap between RACH resources on the time domain, the present disclosure may consider introducing a guard time. The RACH resources that are not overlapped with each other on the time axis may be randomly selected between the NB-IoT devices, or may be configured based on pre-configured values such as IDs of the NB-IoT device. In this connection, the random selection scheme may be performed based on the random number generated by the NB-IoT device at the time of performing the RACH procedure. In one example, the NB-IoT device may generate a random number, and may again select the RACH resources such as the RACH transmission timing and/or the subcarrier index (or frequency position) and/or code (or preamble index) based on the random number. In this case, the base station may find out what random number generated by the NB-IoT device based on the resources used to transmit the RACHs.

On the other hand, as a second example, a base station may allocate a plurality of RACH resources in a code-domain. Basically, it may be assumed that a plurality of NB-IoT devices (or LC devices or BL devices) may transmit RACHs composed of different sequences. The sequence may be randomly selected or preconfigured based on the ID, etc. of the device.

As a third example, the base station allocates multiple RACH resources in the frequency domain. Basically, frequency resources for multiple RACH resources are allocated within the system bandwidth. Different frequency resources may be allocated between NB-IoT device groups or between the coverage classes. More specifically, based on the basic RACH resource (UL sub-band corresponding to the DL sub-band used for PBCH reception, UL sub-band located at the same frequency in TDD, and UL sub-band located at the same position in the frequency spectrum in FDD), several PRACH resources may be used. A mapping between the coverage classes and the available sub-bands may be carried out sequentially. In on example, CE1(1), CE2(2), CE3(3), CE4(1), and CE5 (2) mappings may be achieved when there are three sub-bands and five coverage classes. When the same coverage class is mapped to one sub-band, the resources may be distinguished via TDM/CDM.

The RACH referred to in the above description may be represented by an UL synchronization sequence/signal, pilot, etc. Further, the above-mentioned examples may be applied in combination. For example, in the TDM scheme, overlapped RACH resources on the time axis may be further distinguished via the CDM. In this case, the information about the start subframe and/or slot and/or frame at which RACH transmission may be started may be configured or be pre-specified between the coverage classes.

Moreover, in configuring the resources, the initial RACH transmission resources and the RACH retransmission resources may be individually allocated. In one example, as for the initial transmission, the RACH may be transmitted on a wide frequency resource using CDM, while as for RACH retransmission, the RACH may be retransmitted by selecting the frequency band using the FDMA scheme. Conversely, the opposite may be possible. Alternatively, the FDMA scheme or the CDM scheme (preamble) may be selected between the coverage classes. Alternatively, the RACH transmission scheme may vary depending on the capabilities of the NB-IoT devices. The resource configurations for resource regions with different transmission schemes may be independent of each other. Alternatively, in the case of an inband scenario, that is, when the operating carrier of the NB-IoT device is identical with the operating carrier of the legacy UE, the transmission scheme such as the CDM, etc. may be used. However, when the operating carrier of the NB-IoT device is non-identical with the operating carrier of the legacy UE, FDMA may be selected, or a transmission mode may be designated.

On the other hand, although a plurality of NB-IoT devices (or an LC device or a BL device) may attempt to access the same sub-band at the time of initial connection procedure in the next system, only one NB-IoT device per each band may be supported when starting actually sending or receiving data. In this situation, it is necessary to design the NB-IoT device selection procedure more efficiently. For example, after the base station receives and detects RACHs for a plurality of NB-IoT devices, the base station selects only some or one NB-IoT device and processes the remaining procedures of the initial connection procedure only for the selected devices. The following are more specific examples. In the examples below, the RACH may be considered to be divided into a sequence/signal portion for UL synchronization, and a data portion.

As a first example, before transmitting the data portion of the RACH, the base station selects some or one NB-IoT device (or LC device or BL device) based on the received RACHs. In this case, the base station may transmit a response message to the NB-IoT device based on the sequence/signal transmitted by the selected NB-IoT device. The message may include parameters such as RACH resource, RACH sequence index, etc. Thereafter, a suitable NB-IoT device may transmit the data portion of the RACH to the base station.

As a second example, after the time of transmitting the data part in the RACH, the base station selects some or one NB-IoT device (or LC device or BL device) based on the received RACHs. In this case, there is a high possibility of selecting an NB-IoT device suitable for the corresponding sub-band based on the data transmitted at the initial connection. However, a scheme for managing RACH data collision for various NB-IoT devices may be required.

In the initial connection procedure, the criterion used when the base station selects some or single NB-IoT device (or LC device or BL device) based on the plurality of received RACHs may include the RACH reception time (for example, a device corresponding to the RACH received first), and a type of the received RACH sequence. In this connection, the base station selects the appropriate NB-IoT device to be supported in the corresponding sub-band by selecting the criterion as channel quality, buffer status, device category, etc. in case of RACH resource. In this connection, the advantage of the base station selecting some or a single NB-IoT device from the RACH procedure is as follows: When actually operating in the FDMA mode, the number of NB-IoT devices that can be supported via one sub-band during a certain period of time may be limited. However, resources for the NB-IoT device can be saved by stopping the initial connection procedure in advance for the NB-IoT devices that will not be selected for a long time via scheduling thereof.

When a plurality of initial connection procedures are allowed in one sub-band (after RACH transmission), it is necessary to manage RAR (random access) more efficiently. To this end, the base station may configure a RACH reception window and an RAR window, and broadcast the configuration information to an NB-IoT device (or an LC device or a BL device). By including a control channel indicating the RAR into the RAR window, the base station may transmit the control channel indicating the RAR. The base station may include RARs for all RACHs and some RACHs selected through the specified procedure as detected in the RACH reception window in one transmission channel in a bundling manner and then may transmit the bundle.

In this case, it may also be considered to apply a further backoff at the time of RACH (re) transmission. In this case, the backoff configuration may follow the manners described in section II below.

II. A Case when the RACHs are not Allowed to be Multiplexed by a Plurality of NB-IoT Devices The RACH sequences may be allowed as the same sequence between different NB-IoT devices (or LC devices or BL devices). In this regard, it may be possible to consider reducing the likelihood of collisions between multiple RACHs during the entire initial connection procedure. Basically, the scheme of configuring the backoff time at the time of RACH (re) transmission initially or after collision may be considered. The case when the NB-IoT device can detect the collision presence or absence may be assumed as a case when the device does not receive a random access response (RAR), which is a response to the RACH from the base station. The reference point of time when transmitting the RACH may be designated in advance or may be specified in the form of system information. The reference time point has the same value as when the backoff time is set to 0, and may be repeated at regular intervals. The backoff time may be configured Between the NB-IoT devices, based on parameters including device category, channel quality, buffer status, etc. In addition, the backoff may be independently configured between coverage classes. Additionally or alternatively, the base station may transmit the information about the backoff time to the NB-IoT device by including the information related to the backoff time in the system information. The information on the backoff time may include an offset value that may be referred to when configuring the backoff time, and whether or not the RACH transmission is performed within a predetermined interval (for example, a frame in which system information is transmitted). The configuration may include configuring the actual backoff time. Alternatively, the configuration may comprise configuring a maximum value and randomly configuring a backoff time based on the maximum value. In this case, the NB-IoT device may configure the backoff time to zero according to the urgency. Alternatively, the RACH for the NB-IoT device having the best channel state in consideration of FDMA may be transmitted first so that the NB-IoT device having the best channel state in consideration of FDMA may occupy the corresponding sub-band. For example, the NB-IoT device may detect system information transmitted by the base station (cell), and obtain information about RACH transmission scheme and backoff time from the detected system information. Then, the NB-IoT device may determine, based on the obtained information, the RACH transmission scheme for the frame period corresponding to the system information and transmit the RACH using the determined scheme. In general, it may be assumed that the system information may be intermittently changed. Thereby, the system information may further include a flag based on whether or not the information related to the RACH and/or the backoff time is changed. The system information may further include a duration time during which the RACH and/or the backoff time configurations are maintained. In the latter case, when the next system information is detected, the timer may be changed/set based on the system information as recently received. When the NB-IoT device recognizes the change of the information via the flag or timer initialization, the device may not transmit the RACH within the frame in which the system information is detected in order to prepare for configuration change. Alternatively, the default value may be applied during the configuration change period. In the case of the backoff time, the default value thereof may be configured such that a final value is 0 or an offset value as configured via the upper layer signal is 0. The flag may be configured in a toggle manner.

III. Frequency Hopping for RACH

The basic transmission unit of the RACH may be configured identically regardless of the coverage class. The basic transmission unit of the corresponding RACH may be repeated based on the coverage classes. In this case, in performing RACH transmission based on single or multiple RACH basic transmission units, it is also possible to consider changing the frequency position. In this connection, (1) the frequency position to be included in RACH transmission may be confined within the same sub-band; (2) the NB-IoT device (or LC device or BL device) may perform frequency hopping for all or some region of the UL sub-band corresponding to the cell of the base station corresponding to the initial connection (or receiving the RACH information).

IV. Operation after RACH Selection

When the base station selects one or more NB-IoT devices (or LC devices or BL devices) within a specific sub-band (that is, when sufficient NB-IoT devices are allocated within a specific sub-band), the base station needs to prevent access of a new NB-IoT device to the specific sub-band. When a new NB-IoT device continuously attempts an initial connection, data from an already accessed NB-IoT device may be interfered with by a RACH from the new NB-IoT device. Therefore, after one or more NB-IoT devices are selected in the initial connection procedure, etc., it is necessary for the base station to prevent RACH transmission in the corresponding sub-band.

To this end, the next system may configure messages for each sub-band, such as random access reject or overload indicator/information, etc. In addition, the random access reject or overload indicator information may be configured between the coverage classes and/or between the RACH resources. Likewise, a message may be introduced to allow resumption of random access in order to allow the access of a new NB-IoT device to the sub-band in consideration of the buffer state, etc. This message may be introduced individually for each sub-band.

The random access reject or overload indicator/information may be considered to be managed in a more granular manner for the NB-IoT device (or LC device or BL device). In one example, the random access reject or overload indicator/information may be managed based on the ID of the NB-IoT device and the random number generated by the NB-IoT device at the initial connection. In a more specific example, random numbers may be divided into multiple groups via a modulo operation, etc. Then, the random access may be rejected for each divided group. Alternatively, the overload may be configured for each divided group, or transmission probability, etc. may be specified for each divided group.

For example, it is assumed that the number of groups is 10, and each group results from division of random numbers by a modulo operation value of 10. When it is configured to reject random access for groups other than groups corresponding to the result of the modulo operation being equal to 5, only the NB-IoT device (or the LC device or the BL device) that generated the random number corresponding to the group corresponding to the result of the modulo operation being equal to 5 may transmit the RACH during a certain period (i.e., a time period during which random access is rejected). Collisions between RACHs within the same group may be avoided via RACH resource allocation based on the random number. Alternatively, overload indicator/information may be configured for each RACH resource. When the overload is indicated for the RACH resource, the NB-IoT device may delay the RACH transmission or perform the backoff again. Alternatively, the overload indicator/information may be differently configured between the sub-bands (or subcarriers). In this case, the NB-IoT device may resume the RACH transmission only if the overload indicator/information is not configured for the sub-band (or subcarrier) that the corresponding device uses.

On the other hand, such overload indicator/information may not be considered for retransmission of the RACH. That is, the overload indicator/information may not apply to the retransmission of the RACH. For example, when retransmission is performed more than a predetermined number of times, the NB-IoT device (or the LC device or the BL device) may perform the RACH transmission while ignoring the overload indicator/information. Alternatively, the overload indicator/information may not be applied only in the case of the last retransmission, that is, only when the retransmission reaches the threshold count. The groups may be divided according to the ID of each terminal or may be configured according to the number of retransmissions.

As a simpler approach, whenever the backoff is configured, the counter for the overload indicator/information is increased, and the RACH transmission probability may be reduced to a certain degree for each counter for each overload indicator/information. For example, a backoff may be transmitted per coverage class or sub-band (or subcarrier), and when backoff=0, the counter for the overload indicator/information may be reset to zero. When the backoff is configured, the counter for the overload indicator/information is increased, so that the RACH transmission probability may be reduced, for example to be a probability of 10% for each counter for each overload indicator/information. If the overload indicator/information=4, the RACH transmission is performed only at a probability of 60%, thereby reducing the competition.

When the RACH transmission is interrupted for a relatively short period of time for the purpose of network congestion control, etc., this time period may be excluded from the time interval during which RACH retransmission is allowed. For example, if RACH retransmission is allowed for N time period, and RACH transmission is interrupted by the base station during X time period, X time period is excluded from N time period.

V. Coexistence with Other Systems

The band used to provide the CIoT service may occupy some of the bands in which other systems currently operates. Further, in a situation where another system already operates in the corresponding band, it may be assumed that said another system and the CIoT service co-exist. An operation in such a situation may be called an inband operation. For this purpose, the CIoT structure may have a structure similar to that of the coexisting system. In order for the next system to coexist with the LTE system, the next system may take the CIoT structure as a structure in LTE. The corresponding CIoT scheme may be called NB (Narrowband)—LTE or NB-IoT. The next system considers the CIoT service based on the LTE. The next system considers scaling down subcarrier spacing as a way to utilize the LTE structure. In the LTE system, the subcarrier spacing is 15 kHz, but in NB-IoT (or NB-LTE), subcarrier spacing may be reduced to 2.5 kHz, which is ⅙ of 15 kHz, or to 3.75 kHz. In this case, six RBs may be mapped, based on NB-IoT (or NB-LTE), within a 180 kHz region corresponding to the size of one RB based on LTE. Instead, in the time domain, time resources may be increased six times as compared to LTE, as shown in FIG. 8.

In NB-IoT (or NB-LTE), in the case of PRACH transmission, reuse of the LTE-based scheme may be considered. However, since the subcarrier spacing is assumed to be 1.25 kHz for the PRACH transmission in the LTE based system, scaling down the subcarrier spacing may not be suitable in terms of frequency offset. Therefore, in the embodiment of this section, it is also assumed that subcarrier spacing is set to 1.25 kHz for PRACH transmission in NB-IoT (or NB-LTE).

The generation of the PRACH preamble may be performed using a ZC (Zadoff-Chu) sequence, and the length of the sequence may be considered to be 139. In this case, the region occupied by the PRACH preamble is 173.75 kHz. Therefore, if the sub-band size is 180 kHz, a guard band of 3.125 kHz may be assigned to both ends of the sub-band. Via the corresponding guard band, interference between these systems LTE and NB-IoT (or NB-LTE) may be mitigated during coexistence between LTE and NB-IoT (or NB-LTE). For reference, a 139-length preamble sequence may correspond to reuse of a sequence used in PRACH format 4 for TDD small-scale cells in LTE. In this case, the root index value for the NB-IoT (or NB-LTE) PRACH preamble may be expressed using the following table. As the logical index increases, the CM (cubic metric) increases.

be considered in the following table. In one example, the present disclosure may consider 38 and/or 40 (aiming for 35 km).

TABLE 6

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

The guard time (GT) is designed to overcome the propagation delay during PRACH transmission. In this regard, in the case of CIoT, the radius of the target cell may be 35 km. In this case, to overcome the round trip time (RTT), a minimum value of 233 us is required for the GT. Similarly, in the case of a CP (cyclic prefix) of the PRACH, it is necessary to overcome the RTT. Further, additional gaps may be needed to overcome the delay spread. In one example, the target delay spread may be 16.67 us, in which case, the minimum value of the CP length may be 250 us. The length of the preamble sequence excluding the CP and GT may be expressed by the reciprocal of the subcarrier space and may therefore be expressed as 800 us. In this case, when each of CP and GT is configured to be 250 us, the minimum transmission period length required for PRACH transmission may be configured to be 1.3 msec. In this case, since such a length exceeds one subframe length based on LTE, the corresponding system may be difficult to coexist with LTE operating with TDD (in which there is no continuous multiple UL subframes) in the in-band manner. As a measure for this case, it may be considered to additionally introduce a PRACH format for NB-IoT (or NB-LTE). In this connection, the target delay spread is adjusted to 6.25 us and the target cell radius is configured to be approximately 14 km, so that the CPlength is adjusted to 103.13 us, the GTlength is adjusted to 96.88 us, and the total transmission period is set to 1 msec.

TABLE 5

| Logical root sequence number | Physical root sequence number u (in increasing order of the corresponding logical sequence number) | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | | | | | | | | | | N/A | | | | | | | | | | |

Further, even in the case of the cyclic shift (CS) value for the PRACH preamble, candidates of PRACH format 4 in LTE may be reused. The following table shows an example of a cyclic shift (CS) unit value ($N_{CS}$). Additional CS may In the case of the NB-IoT (or NB-LTE) PRACH preamble having the minimum unit length of 1.3 msec, it may be considered to adjust the minimum unit length to 1.5 msec as a scheme for increasing the GT or CP length. For example, if the length of a subframe in NB-IoT (or NB-LTE) is 6 msec (corresponding to 6 subframes based on LTE), the subframe may be divided into two 3 msec slots. Since the PRACH has a relatively short transmission period relative to the subframe/slot, it may be considered to have a plurality of PRACH resources per subframe or per slot. In one example, an NB-IoT (or NB-LTE) PRACH resource may be specified at the beginning and/or end of an M-SF. Alternatively, an NB-IoT (or NB-LTE) PRACH resource may be specified at the beginning and/or end of the slot. In this case, the number of PRACH resources per subframe may be from 1 up to a maximum of 4 PRACH resources. This will be described with reference to FIG. 11.

Figure 11:
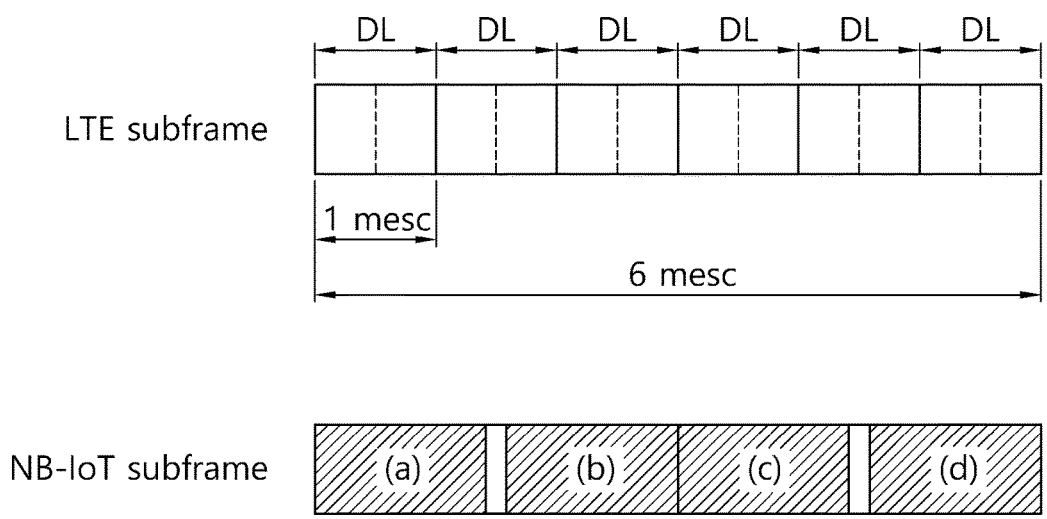
FIG. 11 shows an example in which PRACH resources per a subframe are four when a NB-IoT (or NB-LTE) subframe is 6 ms in length by way of an example.

FIG. 11 illustrates an example in which the number of PRACH resources per subframe is 4 when the NB-IoT (or NB-LTE) subframe is 6 ms in length by way of example.

Referring to FIG. 11, when the NB-IoT (or NB-LTE) subframe is 6 ms in length, PRACH resources per subframe may be four including PRACH resource (a) to PRACH resource (d).

Assuming that the TDD-LTE cell and the NB-IoT (or NB-LTE) cell coexist in an in-band manner, the PRACH resource may be configured when a plurality of successive UL subframes based on the LTE standard are included in the same one slot on the basis of NB-IoT (or NB-LTE) standard or when a plurality of successive UL subframes on the basis of NB-IoT (or NB-LTE) standard exists in 10 subframes (single radio frame 10 msec) based on LTE standard. Meanwhile, when a TDD DL/UL configuration in which one UL subframe exists in a radio frame is used, another PRACH format may be used. As a more specific example, as shown in FIG. 11, when the LTE cell operates using TDD UL-DL configuration 1, two consecutive LTE UL subframes are allocated to the left slot based on NB-IoT (or NB-LTE), whereby only the (b) region may be configured as an NB-IoT (or NB-LTE) PRACH resource. In other words, the PRACH resource for NB-IoT (or NB-LTE) may be configured only for the region corresponding to the UL subframe on the LTE basis.

On the other hand, when TDD is used in NB-IoT (or NB-LTE) communication, the length of the subframe is not always fixed to 6 msec, but the length of the subframe may vary based on the TDD DL/UL configuration. In one example, when TDD UL-DL configuration 1 is used in NB-IoT (or NB-LTE) communication, the length of the subframe may be 2 msec, and only two UL subframes may be included in one radio frame. Further, when TDD UL-DL configuration 5 is used, the length of the subframe may be 1 msec, and only one UL subframe may be included in one radio frame. That is, in the NB-IoT (or NB-LTE) standard, a subframe may be a unit on which one PUSCH or PUCCH is transmitted. Such a unit may be varied based on the TDD DL-UL configuration, for in-band coexistence between both systems.

VI. Coexistence with LTE TDD System

As described above, when the NB-IoT (or NB-LTE) system coexists with the LTE TDD system in an in-band manner, not only the PRACH transmission need to be newly designed, but also the uplink channel and the downlink channel need to be newly designed. When in the NB-IoT (or NB-LTE) system, a subframe has a length of 6 msec, DL/UL interference occurs, thereby causing interference toward the UE and base station communicating based on legacy LTE. Further, the NB-IoT (or NB-LTE) system may also suffer from performance degradation due to interference from the LTE system.

Therefore, following solutions thereto are proposed.

VI-1. Scheme 1: Limit/Ignore Transmission

Briefly, when the NB-IoT (or NB-LTE) system operates, information (for example, TDD UL-DL configuration) about a LTE cell coexisting in an in-band manner with the NB-IoT system) is transmitted to a corresponding NB-IoT device (or LC device or BL device) via the SIB. For example, it may be assumed that an NB-IoT device and a base station operate using a sub-frame of 6 msec length, and, the NB-IoT (or NB-LTE) base station does not perform DL transmissions using a resource portion (totally or partially overlapped symbols) overlapped with the UL subframe of an adjacent LTE system, and, as a result, the NB-IoT device may not expect to receive it. On the other hand, it may be assumed that the NB-IoT device does not perform uplink transmission using a resource portion (totally or partially overlapped symbols) overlapped with a downlink subframe of an adjacent LTE system, and as a result, the NB-IoT base station may not expect to receive it. More specifically, in the case where some NB-IoT (or NB-LTE) symbols are overlapped over a plurality of subframes of an LTE system, the amount of resources that cannot be used may become large, and, thus, present disclosure may reduce the number of symbols per a NB-IoT subframe by changing a CP length. In one example, the number of symbols may be 12 per NB-IoT subframe or may be 6 per NB-IoT slot.

VI-2. Scheme 2: Change of NB-IoT Subframe/Slot Unit

In another scheme, when determining the number of symbols included in the subframe for the NB-IoT (or NB-LTE) system, the length of the subframe for the NB-IoT (or NB-LTE) system may be specified as an X msec length including N symbols instead of 6 msec, based on the LTE extension CP (target delay spread is 16.67 us, whereby the number of symbols per slot is 6). The X value may vary according to the TDD UL-DL configuration of the coexistent LTE system, and the X value may be equal to the number of consecutive LTE UL subframes. When the X value is the same regardless of the TDD UL-DL configuration, the X value may be set to 2. In this case, the LTE system or band that may coexist with the NB-IoT (or NB-LTE) system in an in-band manner may be limited. More specifically, the LTE system with which the NB-IoT (or NB-LTE) system may co-exist in an in-band manner may use TDD UL-DL configurations 2 and 5. In addition, all or some of TDD UL-DL configurations 0, 3, 6 may be excluded from TDD UL-DL configurations used by the LTE system coexisting, in an in-band manner, with the NB-IoT (or NB-LTE). The value of N may be 2*X.

The NB-IoT (or NB-IOT) subframe/slot is not defined for a time region corresponding to a special subframe in an LTE TDD cell, and, thus, the IOT (or NB-LTE) base station and/or device (or LC device or BL device) may not send or receive anything. More specifically, the NB-IoT downlink uses the downlink region of the LTE special subframe, while the NB-IoT uplink may not use the uplink region of the LTE special subframe. The PSS may be transmitted on the LTE special subframe, which may cause a limitation in power boosting in the NB-IoT (or NB-LTE) system. Further, on a resource region that may be used to transmit SRS in the legacy LTE system, the NB-IoT device may not transmit the uplink channel. However, when the special subframe is used by the NB-IoT base station or NB-IoT device (or an LC device or a BL device) for additional resource utilization, the present disclosure may consider bundling some corresponding DL regions and UL regions with subframes/slots of NB-IoT (or NB-LTE) system respectively adjacent thereto, and managing/using the generated bundles. The bundle scheme may consider increasing the number of symbols included in the subframe/slot of the NB-IoT (or NB-LTE) system by an amount as extended by the special subframe. In one example, if the number of symbols included in the downlink subframe for the NB-IoT (or NB-LTE) system is 14, and the downlink region that may be extended using the LTE special subframe corresponds to three symbols, the downlink subframe of the LTE system adjacent to the special subframe may be extended to include 17 symbols. Thus, channel mapping and transmission may be performed based on this extension. The LTE cell and NB-IoT (or NB-LTE) cell co-existing in an in-band manner may have different target cell radii. In this case, a guard period in the special subframe in the NB-IoT (or NB-LTE) system may be excessively large. In this case, it may be considered that the NB-IoT (or NB-LTE) cell utilizes a portion of the guard period as a downlink and/or an uplink resource. In this regard, a portion of the guard period may be used as a separate NB-IoT (or NB-LTE) subframe. As mentioned above, the portion of the guard period may be bundled with an adjacent NB-IoT (or NB-LTE) subframe thereto.

Figure 12:
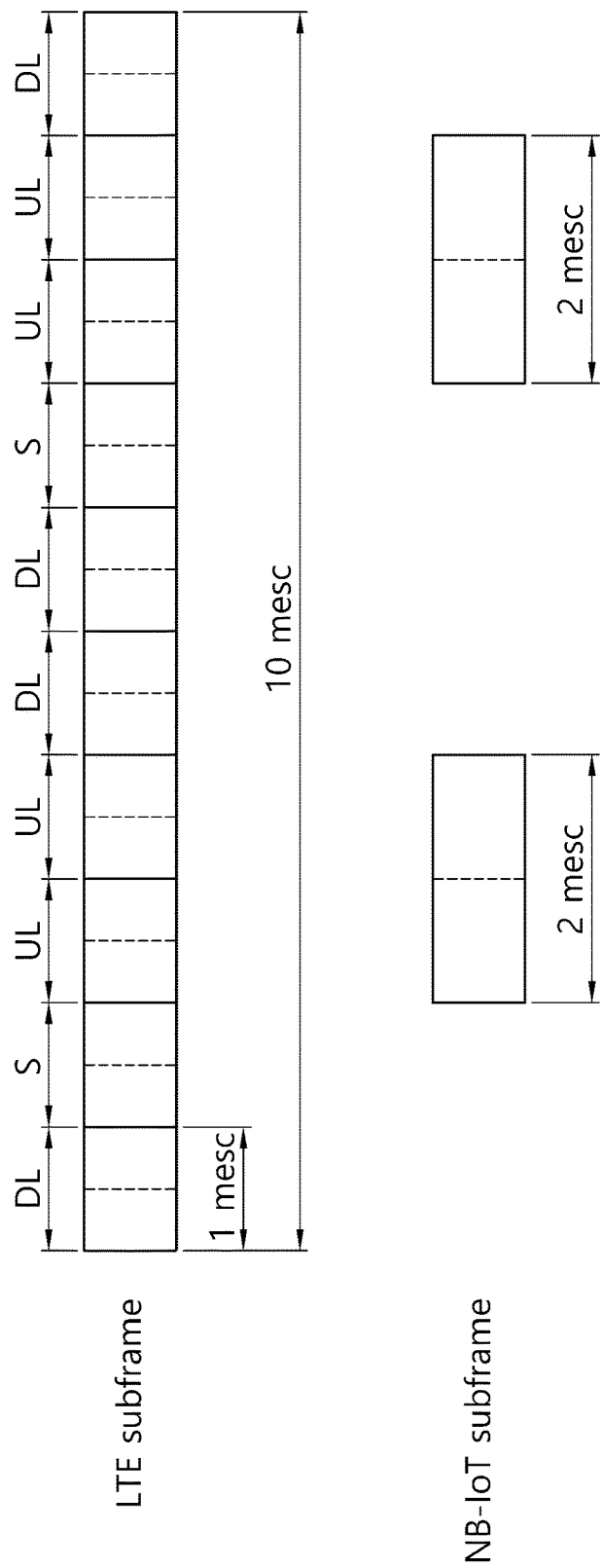
FIG. 12 shows an example of a subframe for an NB-IoT (or NB-LTE) cell when an adjacent LTE cell uses TDD UL-DL configuration 1.

FIG. 12 shows an example of a subframe for an NB-IoT (or NB-LTE) cell when TDD UL-DL configuration 1 is used in an adjacent LTE cell thereto.

Referring to FIG. 12, when TDD UL-DL configuration 1 is used in an adjacent LTE cell to the the NB-IoT (or NB-LTE) cell, the NB-IoT (or NB-LIE) cell may configure the corresponding subframe so that the corresponding subframe has a length of 2 msec.

In this case, each slot of NB-IoT (or NB-LTE) system may include two symbols, and thus the subframe for the NB-IoT (or NB-LTE) system may include a total of four symbols. With respect to the CP length and the data length constituting each symbol, the data length may be 400 usec based on the assumption that the subcarrier spacing is 2.5 kHz. Based on this assumption, the CP length may be 100 usec.

However, when designing the actual CP length, 100 usec may be overly set with considering the target delay spread. Therefore, it may be considered to reduce the actual CP length, and to place a portion of GT behind each symbol.

Figure 13:
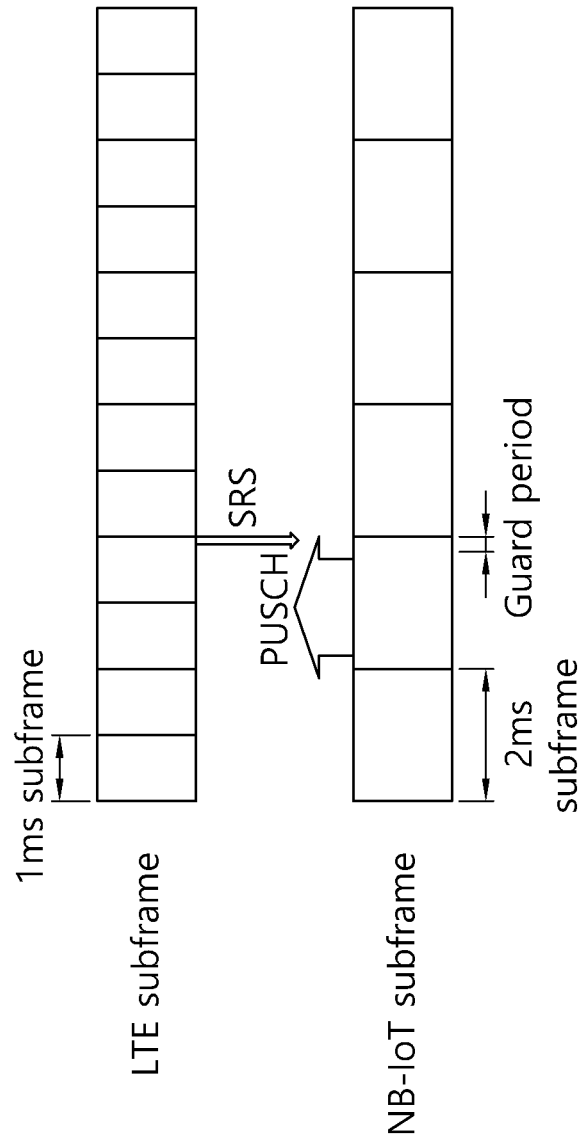
FIG. 13 shows an example of arranging a guard period in an NB-IoT subframe.

FIG. 13 shows an example in which a guard period is arranged in an NB-IoT subframe.

As shown in FIG. 13, a specific period may be configured as a GT in a subframe for the NB-IoT (or NB-LTE) system. In one example, as shown in FIG. 13, the corresponding specific period may be arranged near the last boundary portion of the subframe for the NB-IoT (or NB-LTE) system. The GT may be defined as an entire uplink subframe or a portion of the uplink subframe (overlapping the end boundary portion of the LTE uplink subframe). The secured GT may be used to prevent collision with SRS in the legacy LTE system. In FIG. 13, by way of example, the length of the NB-IoT subframe is set to 2 ms.

To this end, the CP length may be configured as 6.25 usec or 16.67 usec. The remaining period (for example, 83.33 usec) may be configured as GT. As a result, it is possible to secure the transmitting of the SRS by the legacy LTE UE.

In a similar manner, the concept of this scheme may be extended to other TDD UL-DL configurations. In one example, when the number of consecutive uplink subframes is 2 (that is, when TDD UL-DL configuration 4 is applied), a subframe for the NB-IoT (or NB-LTE) system of a 2 msec unit may be introduced as described above. Further, a subframe for the NB-IoT (or NB-LTE) system of a 3 msec unit may be introduced when there are three consecutive uplink subframes (for example, when the TDD UL-DL configuration 0 or 3 is applied). In this case, the number of symbols constituting the subframe for the NB-IoT (or NB-LTE) system may be seven. This is configured in order to keep the number of symbols per slot constant in the NB-IoT (or NB-LTE) system. Alternatively, the number of symbols constituting the subframe for the NB-IoT (or NB-LTE) system may be set to six. This may be done by adjusting the CP length. As in the TDD UL-DL configuration 6, when the number of consecutive uplink subframes exists in a plurality of numbers in a radio frame, a case when the consecutive uplink subframes are 2 may be combined with a case when the consecutive uplink subframes are 3. If the number of consecutive uplink subframes is 1 (there is no continuous uplink subframe), the unit of the subframe for the NB-IoT (or NB-LTE) system is set to 1 msec, and the number of symbols is set to 2.

The symbols constituting the subframe for the NB-IoT (or NB-LTE) system in the above manner may be further divided into a DMRS (demodulation reference signal) portion and a data portion at the time of UL transmission (for example, PUSCH).

In one example, when the number of symbols constituting the subframe for the NB-IoT (or NB-LTE) system is two, the first symbol may be allocated as a DMRS symbol on a NB-IoT subframe basis. In this case, even when the second symbol is affected by the legacy SRS, the data region may basically be protected via HARQ operation.

When the number of symbols constituting the subframe for the NB-IoT (or NB-LTE) system is 4, the second and/or third symbols may be designated as the DMRS symbol. In this connection, if there are two DMRS symbols, frequency hopping may be performed on the NB-IoT (or NB-LTE) slot basis. This may be necessary to reflect channel environment that change over time as the length of each symbol increases. Alternatively, both ends (first and fourth) symbols may be designated as DMRS symbols in order to better reflect the channel environment that may change on the time axis as the length of each symbol increases. Alternatively, in order to perform repetitive frequency hopping in the same pattern on the NB-IoT (or NB-LTE) slot basis, the DMRS symbol may be mapped to the first and third symbols or to the second and fourth symbols.

In the case where the number of symbols constituting the subframe for the NB-IoT (or NB-LTE) system is 6, the middle two symbols (third and fourth symbols) or both ends symbols (the first and sixth symbols) may be mapped to the DMRS symbol. Alternatively, the middle symbols (second and fifth symbols) may be mapped to the DMRS symbol on the NB-IoT (or NB-LTE) slot basis. More specifically, it may be possible to consider configuring the LTE system so that the DMRS symbol is transmitted on an LTE subframe or slot basis. In one example, the present disclosure may also map a DMRS symbol to an odd index or symbol at an even index.

When the number of symbols constituting the subframe for the NB-IoT (or NB-LTE) system is 7, the DMRS symbol may be mapped to the fourth or both end symbols (the first and seventh symbols), or to the second and sixth symbols, or to both ends symbols and the middle symbol (first, fourth, and seventh symbols) in order to comply with the legacy PUSCH structure.

VI-3. Scheme 3: Change of Subcarrier Spacing Unit

In another scheme, the subframe unit of the NB-IoT (or NB-LTE) cell may be set to 1 msec, in consideration of the in-band coexistence with the TDD LTE cell, in the same manner as the LTE system. However, the present disclosure may consider changing the subcarrier spacing. The main reason for doing this is as follows: In the case of excessive scaling down of subcarrier spacing, the number of symbols transmitted for 1 msec is limited, and the overhead occupied by DMRS symbols may be large. Further, instead of changing the subframe structure of the NB-IoT (or NB-LTE) system based on the TDD UL-DL configuration, the subframe structure of the NB-IoT (or NB-LTE) may be configured based on 1 msec. Thus, in a situation where the NB-IoT (or NB-LTE) system coexists with the TDD-LTE system, resource management may be facilitated. When scaling down the subcarrier spacing excessively, the degree of coherence of power to a specific resource (hereinafter referred to as "power boosting" degree) may be mitigated. The candidate subcarrier spacing that may be considered in embodiments may include (15 kHz), 7.5 kHz, 5 kHz, 3.75 kHz, 3 kHz (, 2.5 kHz). These candidate values may be uplink subcarrier spacing for the NB-IoT (or NB-LTE) system when the NB-IoT (or NB-LTE) system coexists with the TDD-LTE system. In an alternative, these candidate values may be applied at all times. In the former case, signaling may be provided such that a plurality of subcarrier spacings are configured. In this case, the NB-IoT device may determine a subcarrier spacing for a corresponding cell among the plurality of subcarrier spacings. Meanwhile, the length of the NB-IoT subframe may be determined based on the subcarrier spacing. For example, if the subcarrier spacing is 15 kHz, the length of the subframe may be determined as 1 ms. However, if the subcarrier spacing is 3.75 kHz, the length of the subframe may be determined to be 2 ms. Furthermore, the number of symbols included in the subframe may be determined based on the subcarrier spacing. For example, the number of symbols that constitute a subframe of a 1 msec length for the NB-IoT (or NB-LTE) system is (14 or 12), 7 or 6, 4, 3, 2 depending on the subcarrier spacing. In this case, the DMRS symbol configuration for the PUSCH may be described as in the II. Scheme section.

In this manner, the number of uplink subframes available continuously may be changed based on the TDD UL-DL configuration, and, thus, the number of OFDM symbols transmitted in the PUSCH/PUCCH may be changed based on the configuration, or the subcarrier spacing may be changed based on the configuration. The change value may determined based on the UL-DL configuration. In other words, based on the TDD UL-DL configuration, one transmission unit TTI may be 1 msec in the case of downlink, while in the case of uplink, the TTI may vary (for example, TDD UL-DL configuration 0=3 msec, TDD UL-DL configuration 1=2 msec, TDD UL-DL configuration 2=1 msec, etc.). In the case of downlink, transmission takes place over 1 msec, but transmission may be done over a longer TTI via resource allocation, etc. The minimum TTI may be 1 msec. In general, the uplink TTI may be set to 1 msec so that the same subcarrier spacing applies to all UL-DL configurations n. It may be assumed when the uplink TTI=2 msec that UL-DL configuration (for example, UL-DL configuration 2), etc., which does not support the uplink TTI=2 msec may be not configured for an NB-IoT (or NB-LTE) device. When the uplink TTI=1 msec is supported, a TTI with two OFDM symbols may be configured. In this case, it may be assumed that 3 symbols TTI may be constructed by adding one symbol thereto using preceding UpPTS and GP. In general, additional symbols may be constructed using the UpPTS and GP. Further, whether there is or not such a symbol addition may be configured by the network.

More specifically, uplink resources and PRACH transmission resources may be configured based on the TDD DL/UL configuration as follows. This may be applied when it should be used in conjunction with a TDD configuration, for example, using 15 kHz configured via multiples of 3.75 kHz.

1) TDD UL-DL configuration 0: The arrangement between downlink subframes and uplink subframes is DSUUUDSUUU. When performing a 15 kHz numerology four-multiplication on the CP length, a single 3.75 kHz OFDM symbol may be mapped to four OFDM symbols (in the case of 15 kHz). In this case, 7+3=10 OFDM symbols may be mapped to 3 consecutive uplink resources, starting from the uplink subframe, without using the special subframe. Alternatively, when using the special subframe, a total of 11 OFDM symbols may be mapped to three consecutive uplink resources using two OFDM symbols of the special frame and the remaining two OFDM symbols. An uplink may occur every 5 msec.

Figure 14:
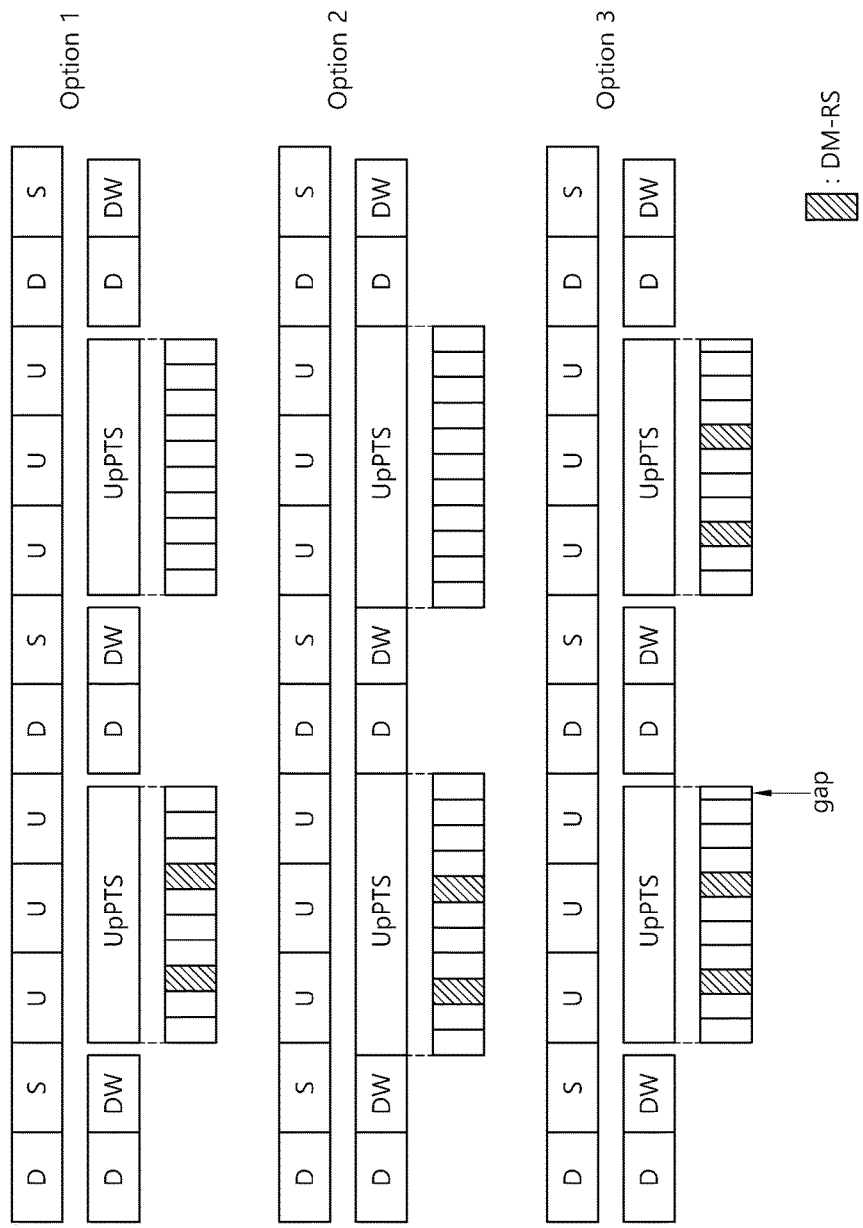
FIG. 14 shows an example of subframes for an NB-IoT (or NB-LTE) cell when an adjacent LTE cell uses TDD UL-DL configuration 0.

Possible options for this configuration are shown in FIG. 14.

In case of doubling the CP or mapping a smaller number of symbols, the additional remaining portion may be used as a gap.

In order that being identical with each other between 2 msec and 1 msec UL structures, the DM-RS symbols may correspond to a third symbol, and a fourth symbol or fifth symbol from a last symbol. Alternatively, the DM-RS position may be different between the configurations.

Figure 15:
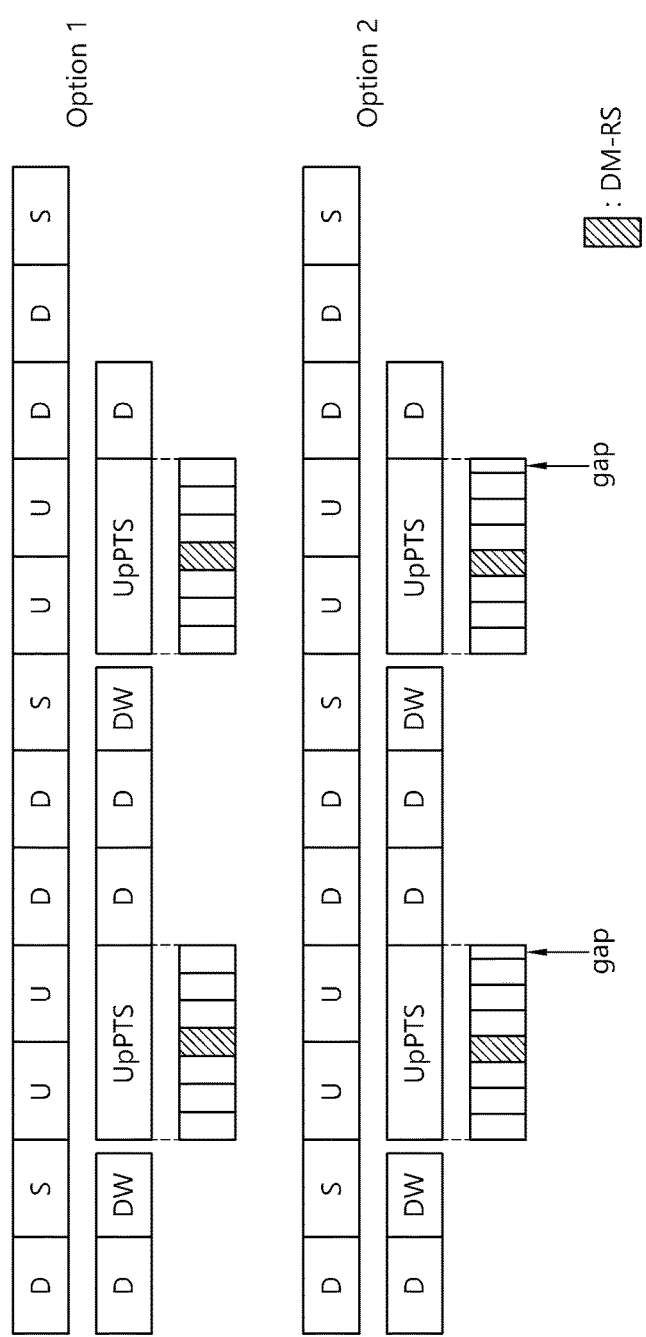
FIG. 15 shows an example of subframes for an NB-IoT (or NB-LTE) cell when a neighboring LTE cell uses TDD UL-DL configuration 1.

2) TDD UL-DL configuration 1:

As shown in FIG. 15, the DM-RS may appear at a middle symbol or it may be used in the same way as the TDD UL-DL configuration 0.

3) TDD UL-DL configuration 2: it may be used in the same way as the TDD UL-DL configuration 0 by aligning three symbols to one UL subframe or by reducing the CP using UpPTS to arrange a gap. It may be assumed that the number of symbols is 3, 4, and 3, and, the DM-RS may appear at the middle symbol.

4) TDD UL-DL configuration 3: The arrangement between downlink subframes and uplink subframes is DSUUUDDDD. As a result, uplink may be configured on a 10 msec basis. This configuration may comply with the uplink structure used in 5 msec of TDD UL-DL configuration 0.

TDD UL-DL configuration 4: The arrangement between the downlink subframes and the uplink subframes is DSUUDDDDDD. As a result, uplink may be configured on a 10 msec basis. This configuration may comply with the TDD UL-DL configuration 1.

TDD UL-DL configuration 5: The arrangement between downlink subframes and uplink subframes is DSUDDDDDDD. As a result, uplink may be configured on a 10 msec basis. This configuration may comply with the TDD UL-DL configuration 2.

7) TDD UL-DL configuration 6: The arrangement between downlink subframes and uplink subframes is DSUUUDSUUD. A former 5 msec portion may comply with the TDD UL-DL configuration 0 while a latter 5 msec portion may comply with the TDD UL-DL configuration 1. Alternatively, a former 5 msec portion may comply with the TDD UL-DL configuration 0 and a latter 5 msec portion may comply with the TDD UL-DL configuration 0, wherein in the latter 5 msec portion, 3 symbols may be subjected to rate matching. Alternatively, a former 5 msec portion may comply with the TDD UL-DL configuration 1 and a latter 5 msec portion may comply with the TDD UL-DL configuration 1, wherein the former 5 msec portion may use only successive two uplinks. Alternatively, a former 5 msec portion may comply with the TDD UL-DL configuration 2 and a latter 5 msec portion may comply with the TDD UL-DL configuration 2. Alternatively, a former 5 msec portion may comply with the TDD UL-DL configuration 1 and a latter 5 msec portion may comply with the TDD UL-DL configuration 2 or vice versa.

Typically, the uplink slot is set to 2 msec. When the number of uplink subframes is odd, a 2 ms uplink slot and a 1 ms uplink slot (including only 3 symbols) may be used. The 2 msec uplink slot may always start at an odd subframe index or at an even subframe index. The 1 msec uplink slot may be regarded as one unit. In this connection, if one uplink resource unit is composed of m 3.75 kHz UL subframes or slots, 2 msec uplink subframe and 1 msec uplink subframe may be considered as one subframe or slot. Therefore, if resource units exists over four subframes, there may be one resource unit within 10 msec in case of TDD UL-DL configuration 0; and in case of configuration 1, there is one resource unit within 20 msec; and in the case of configuration 2, there may be one resource unit within 20 msec.

Characteristically, it may be assumed that one DM-RS may appear within 1 msec or may appear every three symbols. Alternatively, two DM-RSs may appear within 2 ms or every 7 symbols. On the other hand, if 1 msec length corresponds to 3 symbols, one DM-RS symbol may or may not appear.

VII. PRACH Transmission Unit (Depending on TDD Configuration)

The PRACH for the NB-IoT system may be transmitted in the TDD system, or the PRACH may be interfered with or interfere with the TDD system depending on the surrounding cell environment. In this case, the interference may be coped with. Thus, it is necessary to configure the PRACH resource only for the uplink region based on the specific TDD UL-DL configuration. In a simple manner, each length of the PRACH transmission unit, which is a basic unit for the entire PRACH transmission, may be designed to be less than or equal to 1 ms, and each PRACH transmission unit may be assigned to the uplink region. In general, as the number of symbols constituting the PRACH transmission unit increases, the performance of the PRACH detection by the base station can be improved due to transmission repetition, extension of the sequence length, and the like. Therefore, the length of the PRACH transmission unit or the number of symbols constituting the PRACH transmission unit may be different depending on the number of available uplink subframes or a length of the UL region (for example, defined in a symbol unit). More specifically, the uplink region may correspond to the number of consecutive uplink subframes configured based on the TDD UL-DL configuration or a corresponding time period thereto. Further, a time period corresponding to UpPts may be included in the PRACH transmission unit in accordance with the special subframe configuration. These PRACH transmission units may be configured in different PRACH formats or may be configured using configuration parameters from higher layer signals. Alternatively, these PRACH transmission units may be preconfigured based on TDD UL-DL configuration and/or special subframe configuration.

The following illustrates a specific example of a PRACH transmission unit according to consecutive uplink periods based on TDD UL-DL configuration (of 15 kHz subcarrier spacing). In the following embodiments, for convenience of description, the subcarrier spacing for the PRACH is set to 3.75 kHz. However, the present invention is not limited to this. In the case of other subcarrier spacings, the transmission units may be changed to an appropriate number of symbols according to the uplink time periods as described below. If the time period and the length of the PRACH transmission unit are not matched, (1) they may be aligned to the first or last boundary of the uplink time period, including UpPts; or (2) They may be aligned to the first or last boundary based on the group of continuous uplink subframes except UpPts.

VII-1.3 Uplink Subframes+0/1/2 Uplink Symbols

These PRACH transmission units may be expressed as 3 ms, 3.667 ms, and 4.333 ms respectively. In the case of TDD UL-DL configuration, these PRACH transmission units may correspond to the entire time period of #1, and former half frame periods of #3 and #6 respectively. Based on 3.75 kH subcarrier spacing, these PRACH transmission units may correspond to 9 or 11, 12 or 13, 15 or 16 symbols, respectively. When expressing the PRACH transmission units in a unit of ms, these PRACH transmission units may correspond to 9 (2.4 ms), 12 (3.2 ms), and 15 (4 ms) symbols, respectively. More particularly, it may be considered to additionally use a portion of the transmission resource (for example, within one symbol) as a guard period of the special subframe. In this case, these PRACH transmission units including the guard period may correspond to symbols of 12 (3.2 ms), 15 (4 ms), 17 (4.53 ms), or 18 (4.8 ms), respectively.

VII-2.2 Uplink Subframes+0/1/2 Uplink Symbols

These PRACH transmission units may be expressed as 2 ms, 2.667 ms, and 3.333 ms respectively. In the case of TDD UL-DL configuration, these PRACH transmission units may correspond to the entire time period of #1, and a former half frame period of #4 and a latter half frame period of #6. Based on 3.75 kH subcarrier spacing, these PRACH transmission units may correspond to 6 or 7, 9 or 10, 12 symbols, respectively. When expressing the PRACH transmission units in a unit of ms, these PRACH transmission units may correspond to 6 (1.6 ms), 9 (2.4 ms), and 12 (3.2 ms) symbols, respectively. The CP may be set to one symbol. More particularly, it may be considered to additionally use a portion of the transmission resource (for example, within one symbol) as a guard period of the special subframe. In this case, these PRACH transmission units including the guard period may correspond to symbols of 8 (3.2 ms), 9 (2.4 ms), and 13 (3.4667 ms) respectively.

VH-3. 1 Uplink Subframes+0/1/2 Uplink Symbols

These PRACH transmission units may be expressed as 1 ms, 1.667 ms, and 2.333 ms respectively. In the case of TDD UL-DL configuration, these PRACH transmission units may correspond to the entire time period of #2, and a former half frame period of #5. Based on 3.75 kH subcarrier spacing, these PRACH transmission units may correspond to 3, 6, 6 or 8 symbols, respectively. When expressing the PRACH transmission units in a unit of ms, these PRACH transmission units may correspond to 3 (0.8 ms) and 6 (1.6 ms) symbols, respectively. The CP may be set to one symbol. More particularly, it may be considered to additionally use a portion of the transmission resource (for example, within one symbol) as a guard period of the special subframe. In this case, these PRACH transmission units including the guard period may correspond to symbols of 4 (1.0667 ms), 7 (1.8667 ms), and 9 (2.4 ms) respectively.

Figure 16:
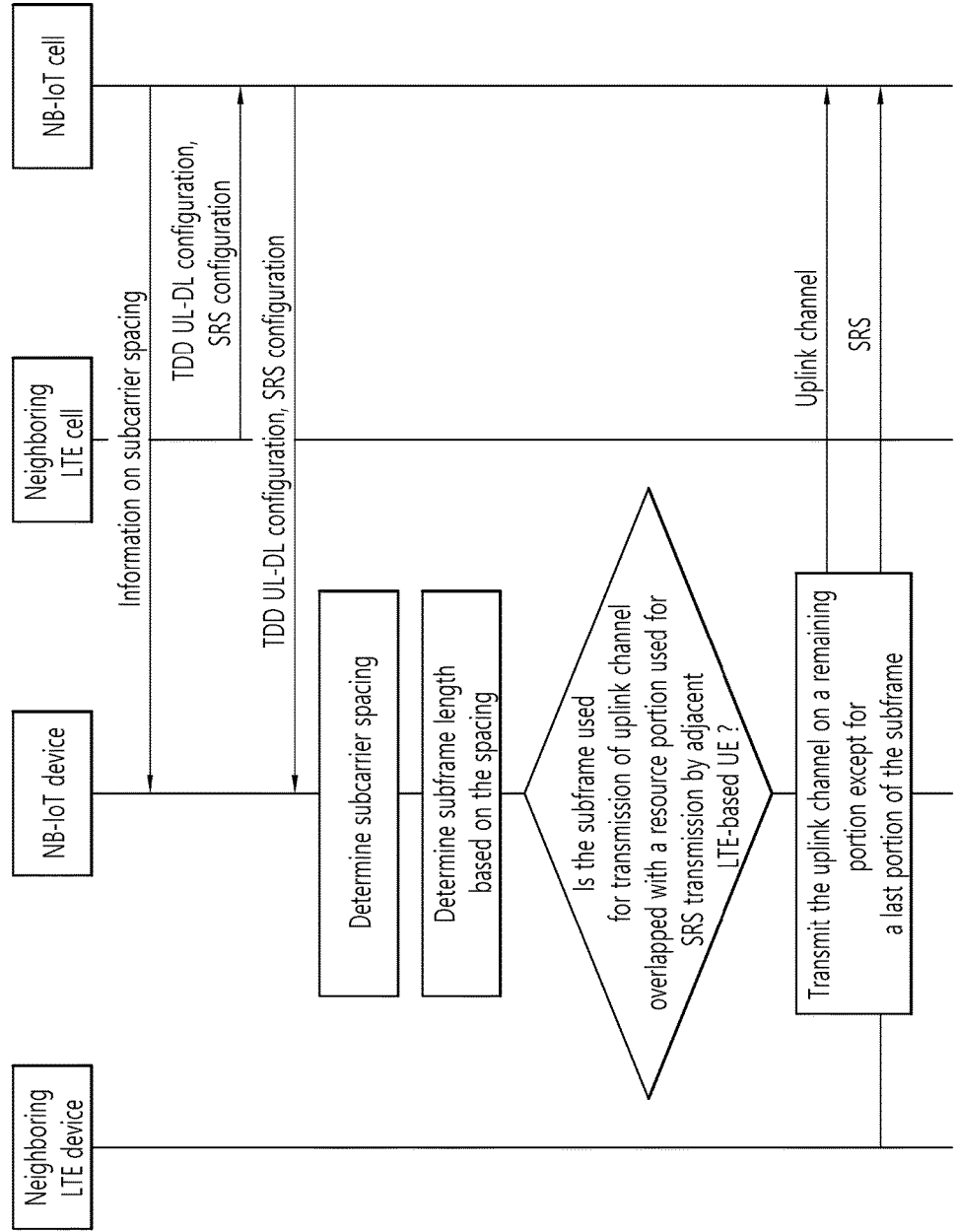
FIG. 16 is a flow chart summarizing some of the embodiments of the present disclosure.

FIG. 16 is a flow chart summarizing some of the embodiments of the present disclosure.

Referring to FIG. 16, an NB-IoT cell signals information on a plurality of subcarrier spacings to an NB-IoT device.

Meanwhile, when the neighboring LTE cell operates in the TDD scheme, the LTE cell transmits information on the TDD UL-DL configuration and the SRS configuration to the NB-IoT cell.

Then, the NB-IoT cell transmits the information on the TDD UL-DL configuration and the SRS configuration of the neighboring LTE cell to the NB-IoT device.

The NB-IoT device determines a subcarrier spacing to be used for the uplink channel based on the transmitted information. In this connection, the subcarrier spacing may be determined as either 3.75 kHz or 15 kHz.

The NB-IoT device determines a subframe length based on the determined subcarrier spacing. If the subcarrier spacing is 3.75 kHz, the subframe length may be determined to be 2 ms. Further, when the subcarrier spacing is 15 kHz, the subframe length may be determined as 1 ms.

If a subframe to be used for transmission of the uplink channel is partially overlapped with the subframe used for transmitting the SRS of the neighboring LTE device, the NB-IoT device transmits the uplink channel only on the remaining portion of the subframe except for a last portion of the subframe.

In this connection, the last portion of the subframe that is excluded in transmission of the uplink channel may be used to secure the SRS transmission by the neighboring LTE device.

According to the foregoing, the NB-IoT device (or LC device or BL device) can effectively transmit the uplink channel.

The embodiments of the present invention described so far may be implemented by various means. For example, embodiments of the present invention may be implemented in hardware, firmware, software or a combination thereof, and the like. More specifically, the descriptions have been made with reference to the drawings.

Figure 17:
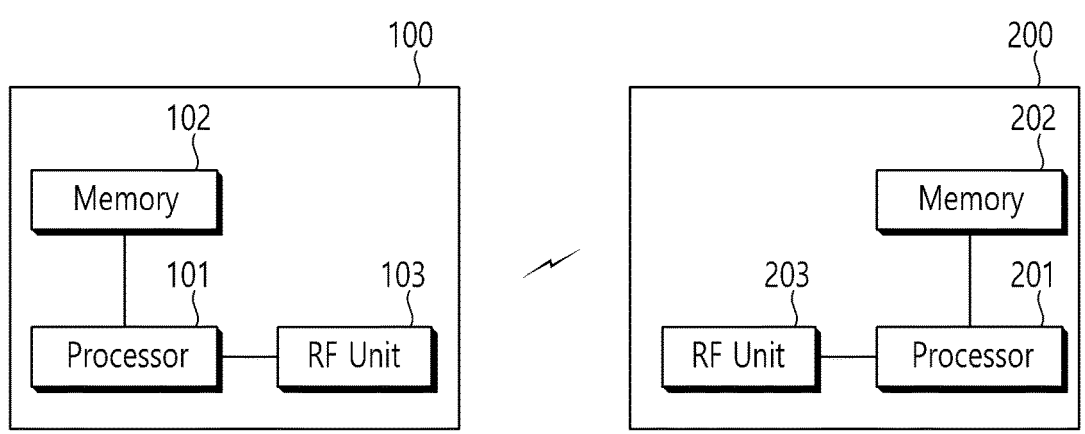
FIG. 17 is a block diagram illustrating a wireless communication system in which an embodiment of the present disclosure is implemented.

FIG. 17 is a block diagram illustrating a wireless communication system in which an embodiment of the present disclosure is implemented.

The base station 200 includes a processor 201, a memory 202 and a transceiver (or radio frequency (or RF unit) 203. The memory 202 is connected to the processor 201 and stores various information for driving the processor 201. The transmission/reception unit (or RF unit) 203 is connected to the processor 201 to transmit and/or receive a radio signal to the processor and/or from the processor. The processor 201 implements the proposed functions, procedures and/or methods as defined above. The operation of the base station as mentioned in the above-described embodiments may be implemented by the processor 201.

A wireless device (e.g., an NB-IOT device) 100 includes a processor 101, a memory 102, and a transceiver (or RF unit) 103. The memory 102 is connected to the processor 101 and stores various information for driving the processor 101. The transmission/reception unit (or RF unit) 103 is connected to the processor 101 to transmit and/or receive a radio signal thereto and/or therefrom. The processor 101 implements the proposed functions, procedures and/or methods as defined above.

The processor may include an application-specific integrated circuit (ASIC), other chipset, logical circuitry, and/or data processing units. The memory may include read-only memory (ROM), random access memory (RAM), flash memory, memory cards, storage media, and/or other storage devices. The RF unit may include a baseband circuit for processing the radio signal. When the embodiments are implemented in software, the above-described techniques may be implemented with modules (procedures, functions, etc.) that perform the functions described above. The module may be stored in the memory and may be executed by the processor. The memory may be internal or external in or to the processor, and may be coupled to the processor by various well known means.

Although in the exemplary system as described above, the methods are described on the basis of a flowchart using a series of steps or blocks, the present invention is not limited to the order of the steps, and some steps thereof may occur in different orders or may occur concurrently. Further, those skilled in the art will understand that the steps as shown in the flowchart are not exclusive, that other steps may be included, or that one or more steps in the flowchart may be deleted, without affecting the scope of the invention.

What is claimed is:

1. A method for transmitting an uplink signal, the method performed by a narrowband-internet of things (NB-IoT) device and comprising:
   determining an uplink subcarrier spacing for transmitting the uplink signal;
   determining a time resource unit based on the uplink subcarrier spacing; and
   transmitting the uplink signal on the time resource unit to a base station,
   wherein the time resource unit includes one or more slots including a plurality of symbols, and
   wherein based on that the uplink subcarrier spacing is determined to be 3.75 kHz, a last portion of the one or more slots is not used for the transmission of the uplink signal.

2. The method of claim 1, wherein based on that the uplink subcarrier spacing is determined to be 3.75 kHz, a length of the one or more slots included in the time resource unit is determined to be 2 ms.

3. The method of claim 1, wherein the last portion of the one or more slots is not used for the transmission of the uplink signal, based on that the last portion of the one or more slots is overlapped with a temporal resource used for transmission of a sounding reference signal (SRS).

4. The method of claim 1, wherein the last portion of the one or more slots is not used for the transmission of the uplink signal to secure transmission of a sounding reference signal (SRS).

5. The method of claim 3, further comprising:
   receiving information on the SRS by higher layer signaling.

6. A narrowband-Internet of things (NB-IoT) device configured for transmitting an uplink signal, the NB-IoT device comprising:
   a transceiver configured to transmit and receive a radio signal; and
   a processor operatively connected to the transceiver, wherein the processor is configured to:
   determine an uplink subcarrier spacing for transmitting the uplink signal;
   determine a time resource unit based on the uplink subcarrier spacing; and
   control the transceiver to transmit the uplink signal on the time resource unit to a base station,
   wherein the time resource unit includes one or more slots including a plurality of symbols, and
   wherein based on that the uplink subcarrier spacing is determined to be 3.75 kHz, a last portion of the one or more slots is not used for the transmission of the uplink signal.

7. The NB-IoT device of claim 6, wherein based on that the uplink subcarrier spacing is determined to be 3.75 kHz, a length of the one or more slots included in the time resource unit is determined to be 2 ms.

8. The NB-IoT device of claim 6, wherein the last portion of the one or more slots is not used for the transmission of the uplink signal, based on that the last portion of the one or more slots is overlapped with a temporal resource used for transmission of a sounding reference signal (SRS).

9. The NB-IoT device of claim 8, wherein the processor is further configured to:
  control the transceiver to receive information on the SRS by higher layer signaling.

10. The NB-IoT device of claim 6, wherein the last portion of the one or more slots is not used for the transmission of the uplink signal to secure transmission of a sounding reference signal (SRS).

\* \* \* \* \*